US012784086B1

(12) United States Patent
Narayana et al.

(10) Patent No.: US 12,784,086 B1
(45) Date of Patent: Nov. 3, 2026

(54) AUTOMATED TOOL FOR DETERMINING AND USING USER-SPECIFIC DWELLING SEARCH CRITERIA TO PROVIDE IMPROVED SEARCH RESULTS

(71) Applicant: MFTB Holdco, Inc., Seattle, WA (US)

(72) Inventors: Manjunath Narayana, Chino Hills, CA (US); Eric Karl Ringger, Seattle, WA (US); Ondrej Linda, Sammamish, WA (US); Saeid Balaneshinkordan, Sammamish, WA (US); Rajendra Waman Shioramwar, San Ramon, CA (US)

(73) Assignee: MFTB Holdco, Inc., Seattle, WA (US)

( * ) Notice: Subject to any disclaimer, the term of this patent is extended or adjusted under 35 U.S.C. 154(b) by 169 days.

(21) Appl. No.: 18/818,039

(22) Filed: Aug. 28, 2024

(51) Int. Cl.
*G06Q 30/00* (2023.01)
*G06Q 30/0601* (2023.01)
*G06Q 50/16* (2012.01)

(52) U.S. Cl.
CPC ..... *G06Q 30/0627* (2013.01); *G06Q 30/0641* (2013.01); *G06Q 50/16* (2013.01)

(58) Field of Classification Search
CPC ........... G06Q 30/0627; G06Q 30/0641; G06Q 50/16; G06Q 30/0629; G06Q 30/0643; G06Q 30/06431; G06Q 30/06432; G06Q 30/06433; G06Q 30/06434; G06Q 30/06435; G06Q 30/0644; G06Q 30/06442; G06Q 30/06444
USPC ...................................................... 705/26, 27
See application file for complete search history.

(56) References Cited

U.S. PATENT DOCUMENTS

| | | | | |
|---|---|---|---|---|
| 12,293,301 | B2 * | 5/2025 | Corredor Ortega | G06F 16/215 |
| 2024/0338775 | A1 * | 10/2024 | Mullins | G06Q 10/0635 |
| 2024/0370432 | A1 * | 11/2024 | Devaux | H04L 51/02 |
| 2024/0386512 | A1 * | 11/2024 | Reddy | G06F 16/9538 |

(Continued)

OTHER PUBLICATIONS

“Zillow’s new AI-powered natural-language search is a first in real estate”, Jan. 26, 2023, retrieved on Nov. 22, 2023 from https://investors.zillowgroup.com/investors/news-and-events/news/news-details/2023/Zillows-new-AI-powered-natural-language-search-is-a-first-in-real-estate/default.aspx, 2 pages.

(Continued)

*Primary Examiner* — Robert M Pond
(74) *Attorney, Agent, or Firm* — FIG. 1 Patents

(57) ABSTRACT

Techniques are described for performing automated operations related to determining and using user-specific dwelling search criteria to provide improved search results, such as in at least some situations to automatically use one or more trained large language models to analyze multiple modalities of data for a group of dwellings associated with a user to predict and confirm user-specific search criteria preferences corresponding to shared attributes of the dwellings before further using the user-specific search criteria preferences to provide improved dwelling search results. The described techniques may include using a trained large language model to analyze data of multiple modalities for a group of dwellings associated with a particular user, to identify shared attributes of the dwellings and determine one or more associated predicted preferences of the user, and include interacting with the user to obtain confirmation or denial of one or more of the predicted user preferences.

26 Claims, 14 Drawing Sheets

(56) References Cited

U.S. PATENT DOCUMENTS

2025/0013888 A1* 1/2025 Corredor ................. G06F 16/29

OTHER PUBLICATIONS

"Zillow builds ChatGPT plugin for real estate searches", May 2, 2023, retrieved on Dec. 18, 2023 from https://investors.zillowgroup.com/investors/news-and-events/news/news-details/2023/Zillow-builds-ChatGPT-plugin-for-real-estate-searches/default.aspx, 2 pages.
Homesnapblog, "New: Draw Your Own Search Area To Look For Homes", May 24, 2018, retrieved on Nov. 22, 2023 from https://blog.homesnap.com/homesnap-draw-your-own-search-area-homes/, 8 pages.
"Zillow home-search tools that can help you search multiple locations—or draw your own search map", Feb. 26, 2013, retrieved on Nov. 22, 2023 from https://www.zillowgroup.com/news/new-draw-your-own-search-on-zillow-com/, 4 pages.
Brian Carmody, "The 7 Best Real Estate Websites of 2024", Dec. 13, 2023, retrieved on Jan. 5, 2024 from https://www.investopedia.com/best-real-estate-websites-5069964, 19 pages.
Matt G. Southern, "Google Maps Makes It Easier To Find Restaurants And Bars", Jun. 27, 2018, retrieved on Jan. 5, 2024 from https://www.searchenginejournal.com/google-maps-makes-it-easier-to-find-restaurants-and-bars/258949/, 3 pages.
"How Google Uses Location Information—Privacy & Terms", retrieved on Jan. 13, 2024 from https://policies.google.com/technologies/location-data, 13 pages.
Erwin van Holten, "How To Find Restaurants Other Than My Location", Mar. 6, 2023, retrieved on Jan. 5, 2024 from https://support.google.com/maps/thread/204943052/how-to-find-restaurants-other-than-my-location?hl=en, 5 pages.
"Searching For Homes—Redfin Customer Service", retrieved on Jan. 11, 2024 from https://support.redfin.com/hc/en-us/articles/360001432632-Searching-for-Homes, 11 pages.
Sarah Lentz, "Zillow And Redfin Announce ChatGPT Plugins To Change The Way People Search For Homes", May 4, 2023, retrieved on Jan. 13, 2024 from https://nowbam.com/zillow-and-redfin-announce-chatgpt-plugins-to-change-the-way-people-search-for-homes/, 5 pages.
Kim Martineau, "What is retrieval-augmented generation?", Aug. 22, 2023, retrieved on Nov. 29, 2023 from https://research.ibm.com/blog/retrieval-augmented-generation-RAG, 5 pages.
Sander Schulhoff, "LLMs That Reason And Act", retrieved on Nov. 29, 2023 from https://learnprompting.org/docs/advanced_applications/react, 4 pages.
Bryan McKenney, "Teaching LLMs To Think And Act: ReAct Prompt Engineering", Jun. 9, 2023, retrieved on Nov. 29, 2023 from https://medium.com/@bryan.mckenney/teaching-llms-to-think-and-act-react-prompt-engineering-eef278555a2e, 15 pages.
Rick Merritt, "What Is Retrieval-Augmented Generation aka RAG?", Nov. 15, 2023, retrieved on Nov. 29, 2023 from https://blogs.nvidia.com/blog/what-is-retrieval-augmented-generation/, 5 pages.
Zachary Proser, "Retrieval-Augmented Generation (RAG): The Solution To GenAI Hallucinations", Aug. 3, 2023. retrieved on Nov. 29, 2023 from https://www.pinecone.io/learn/retrieval-augmented-generation/, 12 pages.

* cited by examiner

Example GUI and Interactions

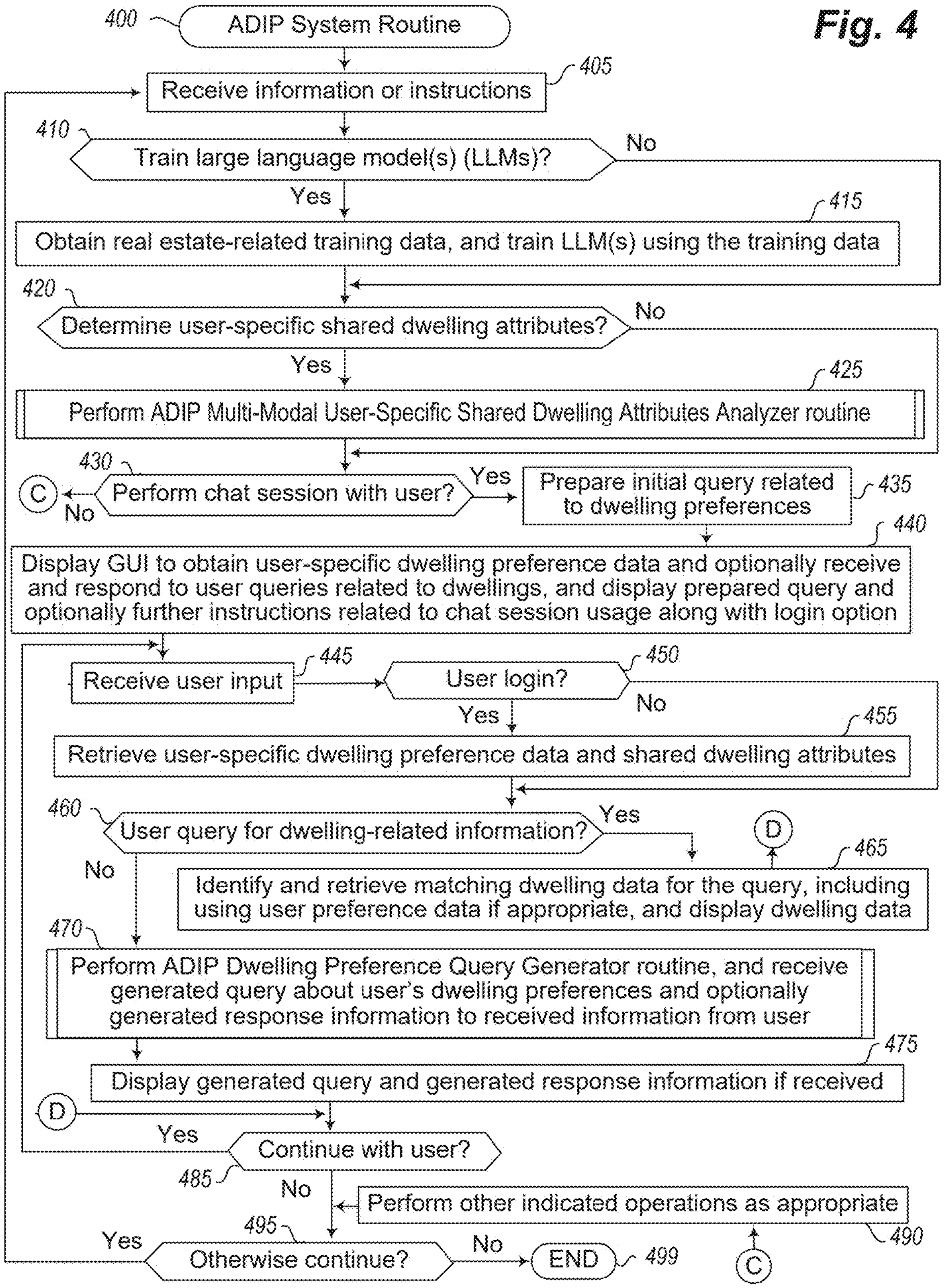
Fig. 4
400
ADIP System Routine
405
Receive information or instructions
410
Train large language model(s) (LLMs)?
No
Yes
415
Obtain real estate-related training data, and train LLM(s) using the training data
420
Determine user-specific shared dwelling attributes?
No
Yes
425
Perform ADIP Multi-Modal User-Specific Shared Dwelling Attributes Analyzer routine
430
C
Perform chat session with user?
No
Yes
Prepare initial query related to dwelling preferences
435
440
Display GUI to obtain user-specific dwelling preference data and optionally receive and respond to user queries related to dwellings, and display prepared query and optionally further instructions related to chat session usage along with login option
Receive user input
445
User login?
450
No
Yes
455
Retrieve user-specific dwelling preference data and shared dwelling attributes
460
User query for dwelling-related information?
Yes
D
465
No
Identify and retrieve matching dwelling data for the query, including using user preference data if appropriate, and display dwelling data
470
Perform ADIP Dwelling Preference Query Generator routine, and receive generated query about user's dwelling preferences and optionally generated response information to received information from user
475
Display generated query and generated response information if received
D
Yes
Continue with user?
485
No
Perform other indicated operations as appropriate
495
490
Yes
Otherwise continue?
No
END
499
C

AUTOMATED TOOL FOR DETERMINING AND USING USER-SPECIFIC DWELLING SEARCH CRITERIA TO PROVIDE IMPROVED SEARCH RESULTS

TECHNICAL FIELD

The following disclosure relates generally to techniques for automatically determining and using user-specific dwelling search criteria to provide improved search results, such as to automatically use one or more trained large language models to analyze multiple modalities of data for a group of dwellings associated with a user to predict and confirm user-specific search criteria preferences corresponding to shared attributes of the dwellings before further using the user-specific search criteria preferences to provide improved dwelling search results.

BACKGROUND

An abundance of information is available to users on a wide variety of topics from a variety of sources. For example, portions of the World Wide Web ("the Web") are akin to an electronic library of documents and other data resources distributed over the Internet, with billions of documents available, including groups of documents directed to various specific topic areas (e.g., buildings of various types). In addition, various other information is available via other communication mediums. However, existing search engines and other techniques for identifying information of interest suffer from various problems. Non-exclusive examples include a difficulty in understanding natural language requests, difficulty in providing accurate information that is specific to a particular topic of interest, difficulty in limiting information requests to approved topics, etc.

BRIEF DESCRIPTION OF THE DRAWINGS

FIG. 4 illustrates a flow diagram of an example embodiment of an Automated Dwelling Information Provider ("ADIP") system routine.

DETAILED DESCRIPTION

Figure 1A:
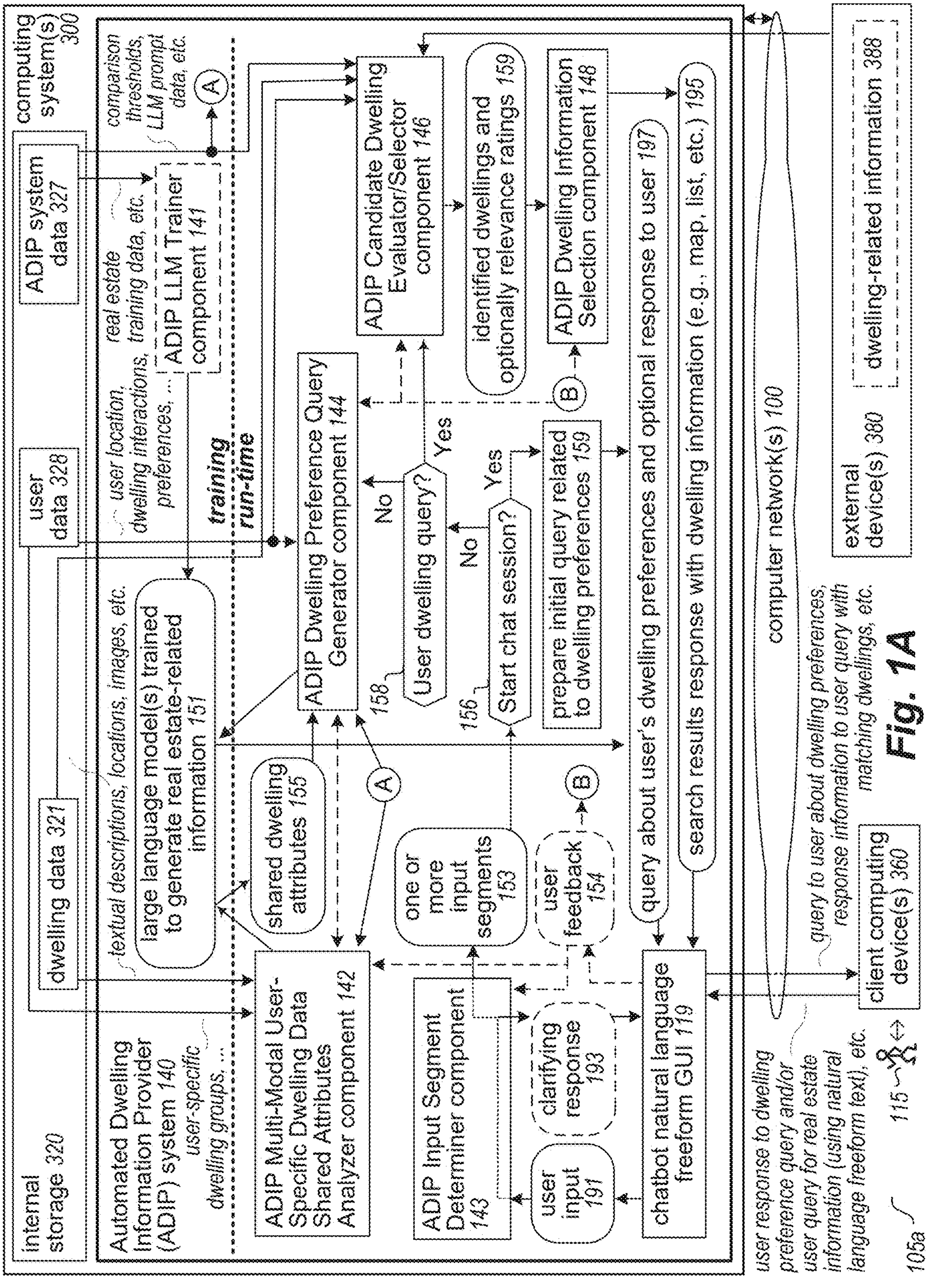
FIGS. 1A-1C are network diagrams illustrating an example system for performing described techniques, including automatically determining and using user-specific dwelling search criteria to provide improved search results.

The present disclosure describes techniques for using computing devices to perform automated operations involving automatically determining and using user-specific dwelling search criteria to provide improved search results, such as in at least some embodiments to automatically use one or more trained large language models to analyze multiple modalities of data for a group of dwellings associated with a user to predict and confirm user-specific search criteria preferences corresponding to shared attributes of the dwellings before further using the user-specific search criteria preferences to provide improved dwelling search results. In at least some embodiments, the described techniques may include the following: identifying a group of dwellings associated with a particular user (e.g., based on prior interactions of one or more types by the user with those dwellings); obtaining descriptive dwelling data for those dwellings that includes multiple modalities of data (e.g., descriptive textual data for each dwelling; visual data for each dwelling, such as from images and/or video; a floor plan or other computer model for each dwelling; etc.); using one or more trained large language models (LLMs) to analyze the data of the multiple modalities to identify shared attributes of the dwellings and determine one or more associated predicted preferences of the user; interacting with the user to obtain confirmation or denial of one or more of the predicted user preferences; and using the resulting updated user preference information to determine and provide improved additional search results to the user (e.g., by using search criteria corresponding at least in part to the updated user preference information). In addition, in at least some embodiments, the interacting with the user includes providing and using an automated chatbot with a graphical user interface (GUI) via which generated natural language queries may be displayed to the user and via which freeform natural language query responses and/or other communications are received from the user, such as with the generation of the natural language queries and/or analysis of the freeform natural language query communications from the user being performed by an LLM (whether the same or different from the one or more LLMs used to identify the shared dwelling attributes of the dwellings associated with the user). Additional details are included below regarding automatically determining and using user-specific dwelling search criteria to provide improved search results, and some or all of the techniques described herein may, in at least some embodiments, be performed via automated operations of an Automated Dwelling Information Provider ("ADIP") system, as discussed further below.

As noted above, the described techniques may include providing and using an automated chatbot to perform automated interactions with the user, including to determine preference data of the user with respect to dwellings (e.g., to reflect an ongoing search process by the user for one or more dwellings to acquire and/or occupy, and with the group of dwellings associated with the user including candidate dwellings for the ongoing search that were previously interacted with by the user and/or automatically identified for the user by the ADIP system). For example, the described techniques may include using one or more LLMs that power such an automated chatbot to interact with a user by querying the user about one or more of predicted dwelling preferences of the user and by obtaining and using resulting confirmation or denial of the user-specific dwelling preference(s), as discussed in further detail below. Such LLMs may have various architectures and forms in various embodiments, including to use a multi-modal-aware LLM in at least some embodiments and situations that is trained to analyze and use multiple modes of data (e.g., text, images, audio, etc.). In at least some embodiments, such an LLM-powered chatbot may generate and display natural language queries to the user (e.g., about predicted user-specific dwelling preferences) and may receive and analyze freeform natural language query responses and/or other communications from the user. In some embodiments and situations, the automated interactions with the user may include only such interactions related to determining the user preference data, while in other embodiments the interactions with the user may include one or more additional types of interactions, such as to receive search requests from the user that include one or more specified search criteria and to generate and provide corresponding search results (e.g., using current preference data for the user as further search criteria or to otherwise rank and/or filter the search results), to obtain information from the user about changes to the group of dwellings associated with the user and to perform corresponding updates (e.g., to remove one or more indicated existing dwellings currently in the group, such as to reflect a lack of current interest by the user in those one or more indicated existing dwellings, and/or to add one or more indicated new dwellings to the group, such as to reflect a current interest by the user in those one or more indicated new dwellings), etc.

If a search request is received from the user, whether via the chatbot GUI or via another interface (e.g., a different chat interaction session), the search request may be analyzed in various manners, such as by segmenting multiple free-form natural language terms of a received query into multiple segments that each corresponds to a different search criteria, including in at least some embodiments and situations to determine segments that each indicates one of the following: a type of dwelling (e.g., houses, homes, apartments, condominiums, etc.); a geographical area (e.g., cities, counties, states, neighborhoods, etc.); a point-of-interest (POI) location instance (e.g., particular parks, beaches, lakes, businesses, etc.), optionally with a specified distance radius or indeterminate distance indication ("nearby", "close to", etc.); a POI location category (e.g., parks, beaches, lakes, types of businesses, etc.), optionally with a specified distance radius or indeterminate distance indication); a dwelling-related attribute (e.g., number of bedrooms and/or bathrooms, square footage, property size, dwelling style, price, etc.) and optionally one or more associated attribute values; a neighborhood and/or surroundings attribute (e.g., close to a body of water, a kid-friendly area, etc.) and optionally one or more associated attribute values; etc., as well as one or more conjunctive (e.g., "and") and/or disjunctive (e.g., "or") terms to connect two specified search criteria—in other embodiments, some such criteria (e.g., geographical location, POI location, dwelling type, etc.) may be determined in manners other than being included in the search query, such as to be from preferences or other information associated with the user who submits the search query (e.g., based on the user's location, prior search interactions, etc.) and/or based on a search interface being used (e.g., one specific to a particular dwelling type and/or geographical location). Other types of freeform natural language communications from a user may be similarly parsed or otherwise analyzed, including in some embodiments and situations to determine a user confirmation or denial of a user preference indicated in a preceding query that was generated by the ADIP system, to otherwise determine user preferences expressed by the user and/or expressions of interest or disinterest in particular dwellings (e.g., dwellings that are part of a group previously associated with the user), etc.

As noted above, the described techniques may include identifying a group of dwellings associated with a particular user (e.g., based on prior interactions of one or more types by the user with those dwellings). In at least some embodiments and situations, a group of dwellings associated with the user may be based on one or more of the following non-exclusive types of activities: the user viewing information about the multiple dwellings, such as via one or more online interactions by the user with descriptive information about each of the dwellings; the user saving the multiple dwellings for later use, such as via one or more online selections made by the user in association with each of the dwellings; the user requesting additional information about the multiple dwellings, such as from the ADIP system and/or from another user associated with each such dwelling; the ADIP system and/or other system generating recommendations of the multiple dwellings for the user, such as based on previous interactions of the user with other dwellings, based on geographical location of the user, etc.; the user performing in-person tours of the multiple dwellings, such as tours scheduled via the ADIP system or otherwise accessible to the ADIP system; etc.

In addition, as is also noted above, the described techniques may include obtaining and analyzing multiple modalities of data describing the multiple dwellings associated with a user (e.g., descriptive textual data for each dwelling, visual data for each dwelling, a floor plan or other computer model for each dwelling, etc.). As non-exclusive examples, the descriptive textual data for dwelling may include descriptive keyword-value pairs for objective attributes of the dwelling, other narrative textual descriptions of the dwelling (e.g., a textual dwelling occupancy description prepared for listing the dwelling as being available for occupancy and/or acquisition), further textual information from external sources (e.g., public property records, tax records, neighborhood crime reports, neighborhood feature descriptions, etc.), textual information generated from analysis of images of a dwelling interior and/or exterior (e.g., exterior images that are generated from street or other ground level or overhead images of exteriors of the multiple dwellings from at least one of one or more drones or one or more airplanes or one or more satellites), etc. In addition, as nonexclusive examples, the descriptive visual data for dwelling may include video and/or images of the exterior and/or interior of the dwelling, optionally including panorama images and/or non-panorama perspective images, and with at least some of the images and optionally being frames of one or more associated videos. In at least some embodiments and situations, the analysis of some or all of the multiple modalities of data may be performed in part or in whole using one or more trained large language models (LLMs), such as to identify shared attributes of the dwellings and determine one or more associated predicted preferences of the user. As discussed in greater detail below, such use of one or more LLMs may include providing a group of descriptive data of one or more types for one or more dwellings to the LLM(s) along with one or more prompts generated to cause the LLM(s) to produce output data of one or more types, such as a textual description for one or more images or other visual data, an identification of one or more shared attributes between the descriptive data of multiple dwellings, etc. FIG. 1D provides additional details regarding nonexclusive examples of multiple modalities of such descriptive data for an example dwelling, and additional details are included below regarding floor plans and other computer models of dwellings that may be included in the analyzed descriptive data of the multiple modalities for the multiple dwellings associated with a user. In addition, further details are included below regarding use of the LLMs to determine shared attributes between the descriptive data of multiple dwellings and to predict corresponding dwelling preferences of an associated user, regarding interacting with the user to confirm or deny particular predicted user-specific dwelling preferences, and regarding using resulting updated user preference information to determine and provide improved additional search results to the user, including with respect to the examples of FIGS. 2A-2E.

In addition, the ADIP system may perform automated operations to train one or more such LLMs before their use in predicting user-specific dwelling preferences from descriptive dwelling data for a group of dwellings associated with a user and/or in interacting with a user (e.g., via an automated chatbot) to determine actual user-specific dwelling preferences of the user. Such training may include, for example, provides learning involving supplying positive and/or negative examples of annotated data as input and corresponding expected output, such as using training data specific to a real estate domain, while in other embodiments and situations the ADIP system may use one or more general-purpose trained LLMs that are not specific to real estate information. In addition, the use of the LLM(s) may include generating and providing corresponding prompts to cause desired output responses from the LLM(s), as discussed in greater detail below.

The described automated techniques provide various benefits in various embodiments, including to significantly improve the search results and other information about dwellings provided to a user based at least in part on using automatically predicted user-specific dwelling preferences for that user based at least in part on information about a group of multiple dwellings associated with the user, including performing automated interactions with the user in a natural language format using an automated chatbot or other interface. Such automated techniques also allow such responsive answer information to be generated much more quickly and efficiently than previously existing techniques (e.g., using less storage and/or memory and/or computing cycles) and with greater accuracy, based at least in part on using the described techniques, including by determining and using the user-specific dwelling preferences, as well as enabling the user to confirm and/or correct the user-specific dwelling preferences (including to reflect changes over time in the user-specific dwelling preferences), etc. In addition, in some embodiments the described techniques may be used to provide an improved GUI in which a user may more accurately and quickly obtain information, including in response to an explicit request (e.g., in the form of a natural language query), as part of providing personalized information to the user, etc. Various other benefits are also provided by the described techniques, some of which are further described elsewhere herein.

After search results are determined for a user based at least in part on user-specific dwelling preferences, resulting identified target dwelling(s) may be further used in various manners in various embodiments, such as to be presented or otherwise provided as search results (e.g., as a list, optionally rank-ordered; overlaid on a map; etc.). Responsive information for a search query from a user that includes the one or more identified dwellings may further be provided in various manners in various embodiments, such as in a GUI (graphical user interface) displayed to a user who submitted the query via the GUI, and identified target dwellings may be provided for a user in other manners in other embodiments (e.g., via one or more push electronic messages that are not in direct response to a corresponding received search query from the user). In addition, it will be appreciated that various types of information may be provided for an identified dwelling, such as images, textual descriptions, 3D models and other floor plans, prices, statistical data (e.g., square feet, quantity of bedrooms and bathrooms, etc.), videos, comments and other user-generated data, etc., that types of information may be selected to be provided in various manners (e.g., based on instructions received in the search query, using user preferences, using defaults unless otherwise specified, etc.), and that a GUI provided by the ADIP system (e.g., via an automated chatbot) may provide functionality to enable a user to obtain further information about one or more dwellings selected by the user.

As noted above, the automated operations of the ADIP system in at least some embodiments include, for a received query using multiple free-form natural language terms to specify multiple search criteria, segmenting the terms in the received query into one or more segments each corresponding to an indicated search criterion. Such segmenting of the sequence of term(s) may be performed in various manners in various embodiments, such as by identifying matches in one or more dictionaries (e.g., general-purpose dictionaries, dictionaries of POI location names, dictionaries of geographical area names, etc.), lists of predefined keywords, lists of dwelling types, or other lists of word/phrase breaks, etc. In addition, in some embodiments and situations, the received query may, in addition to multiple segments each corresponding to a geographical area or a POI location, include one or more additional segments for one or more additional search criteria of one or more types, such as one or more of the following: dwelling-type designations (e.g., 'apartment', 'single family house', 'condominium', etc.); POI categories (e.g., "beaches", "parks", "schools", "hospitals", "lakes", etc.); indeterminate distance indications that are associated with one or more POI locations and/or POI categories (e.g., "nearby" or analogous terms such as "near", "by", "around", "at", "close to", "adjacent", etc.; a travel-based distance measure with an indicated travel type, such as walking or bicycling or scootering or driving or bus or train or light rail or mass transit; etc., and an associated amount of travel time that is specified or otherwise determined); non-location-related search filters or other search criteria, such as search criteria related to dwelling attributes (e.g., minimum and/or maximum and/or target price, number of bathrooms, number of bedrooms, etc.), etc. The automated operations of the ADIP system in at least some embodiments may include managing received search queries that specify an indeterminate travel-based distance that includes at least a travel type and optionally a travel time—in cases in which a travel time is not indicated (e.g., "within walking distance of"), the ADIP system may select a travel time to use, such as specific to that travel type or instead the same for all travel types, based on information specific to the user who submitted the query, etc. The automated operations of the ADIP system in at least some embodiments may further include managing received search queries that specify one or more conjunctive and/or disjunctive terms that each connects two surrounding or otherwise adjacent search criteria (e.g., criteria A 'and' criteria B, criteria A 'or' criteria B, etc., in which A and B may be criterion such as POI location, POI category, dwelling type, geographical area, etc.). In addition, it will be appreciated that various types of information may be provided for an identified dwelling, such as images, textual descriptions, 3D models and other floor plans, prices, statistical data (e.g., square feet, quantity of bedrooms and bathrooms, etc.), videos, comments and other user-generated data, etc., that types of information may be selected to be provided in various manners (e.g., based on instructions received in the search query, using user preferences, using defaults unless otherwise specified, etc.), and that the GUI may provide functionality to enable a user to obtain further information about one or more dwellings selected by the user.

Additional details related to operations for receiving, analyzing and responding to search queries are included in U.S. Non-Provisional patent application Ser. No. 18/583,602, filed Feb. 21, 2024 and entitled "Automated Tool For Determining And Providing Building Information For Multiple Partially Described Proximate Geographical Regions"; in U.S. Non-Provisional patent application Ser. No. 18/642,246, filed Apr. 22, 2024 and entitled "Automated Tool For Determining And Using User-Specific Predicted Attributes Of Dwellings That Users Will Later Occupy"; in U.S. Non-Provisional patent application Ser. No. 18/734,815, filed Jun. 5, 2024 and entitled "Automated Tool For Determining And Providing Information About Dwellings Satisfying Search Criteria Specified Using Multiple Data Modes"; in U.S. Non-Provisional patent application Ser. No. 18/622,829, filed Mar. 29, 2024 and entitled "Automated Tool For Determining And Providing Information About Dwellings Within Geographical Regions That Are Determined Specific To Indicated Locations"; and in U.S. Non-Provisional patent application Ser. No. 18/632,217, filed Apr. 10, 2024 and entitled "Automated Tool For Determining And Providing Information About Dwellings Using Heterogenous Search Strategies"; each of which is incorporated herein by reference in its entirety.

Figure 1B:
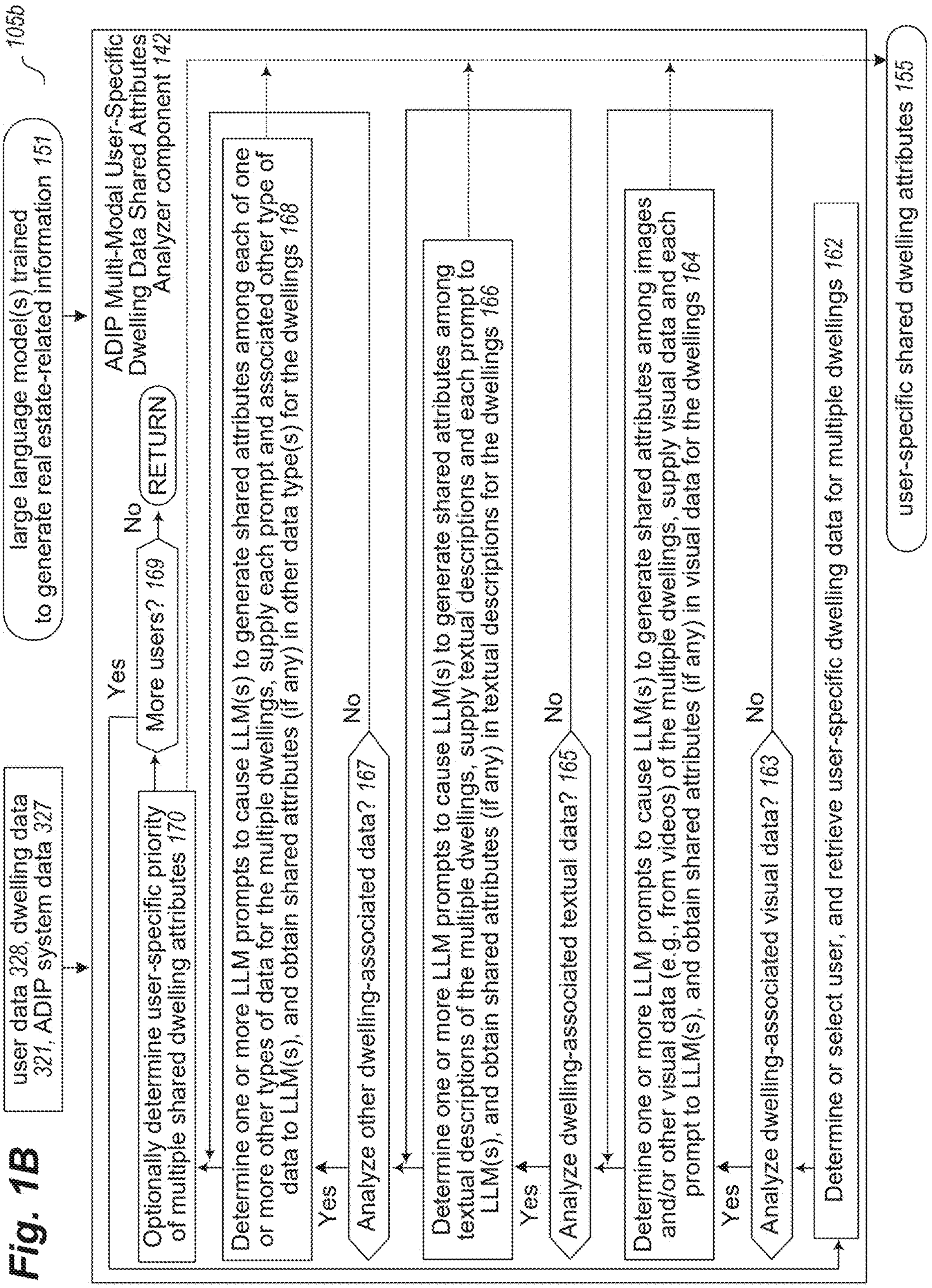
Figure 1C:
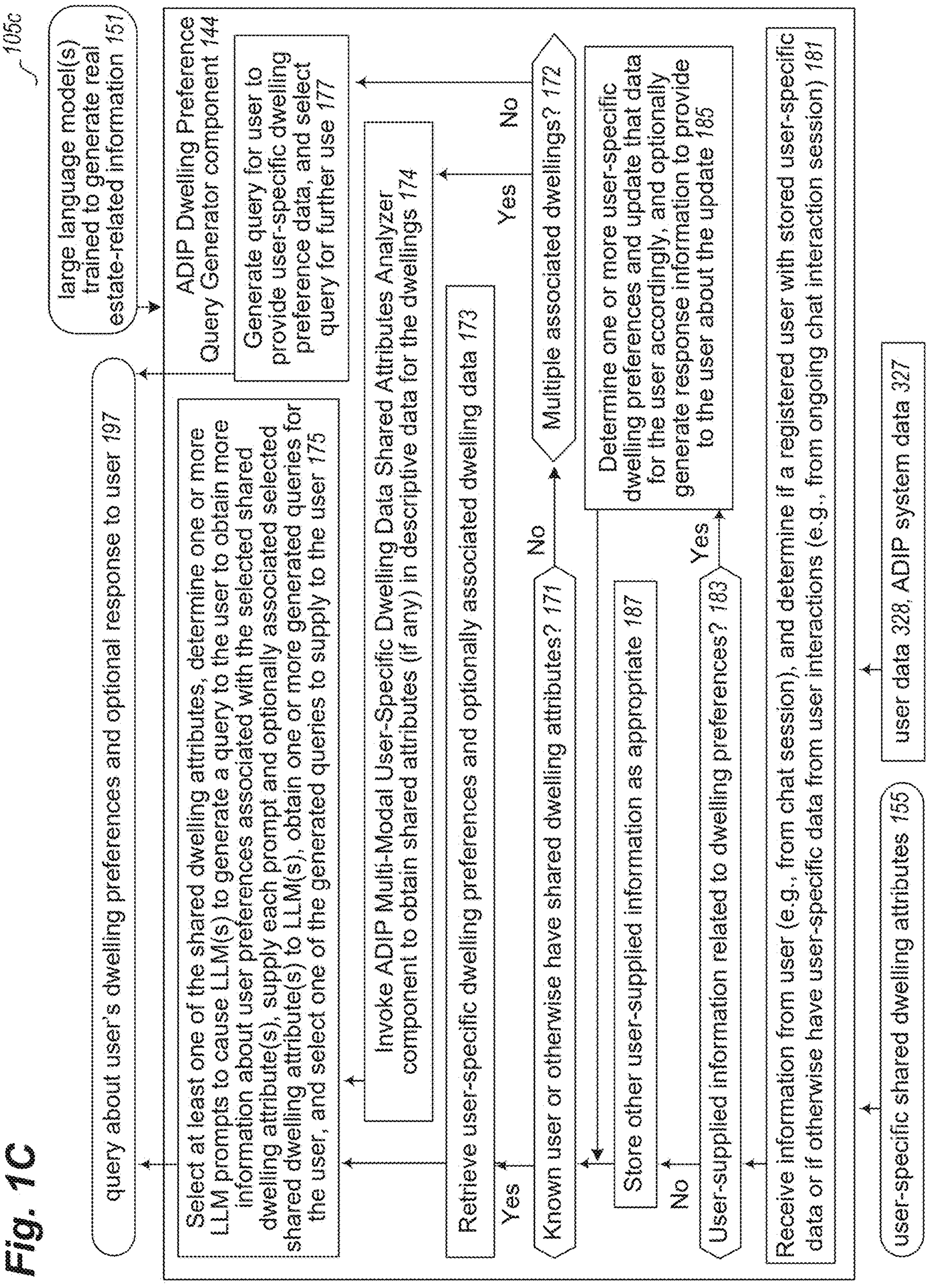
Figure 1D:
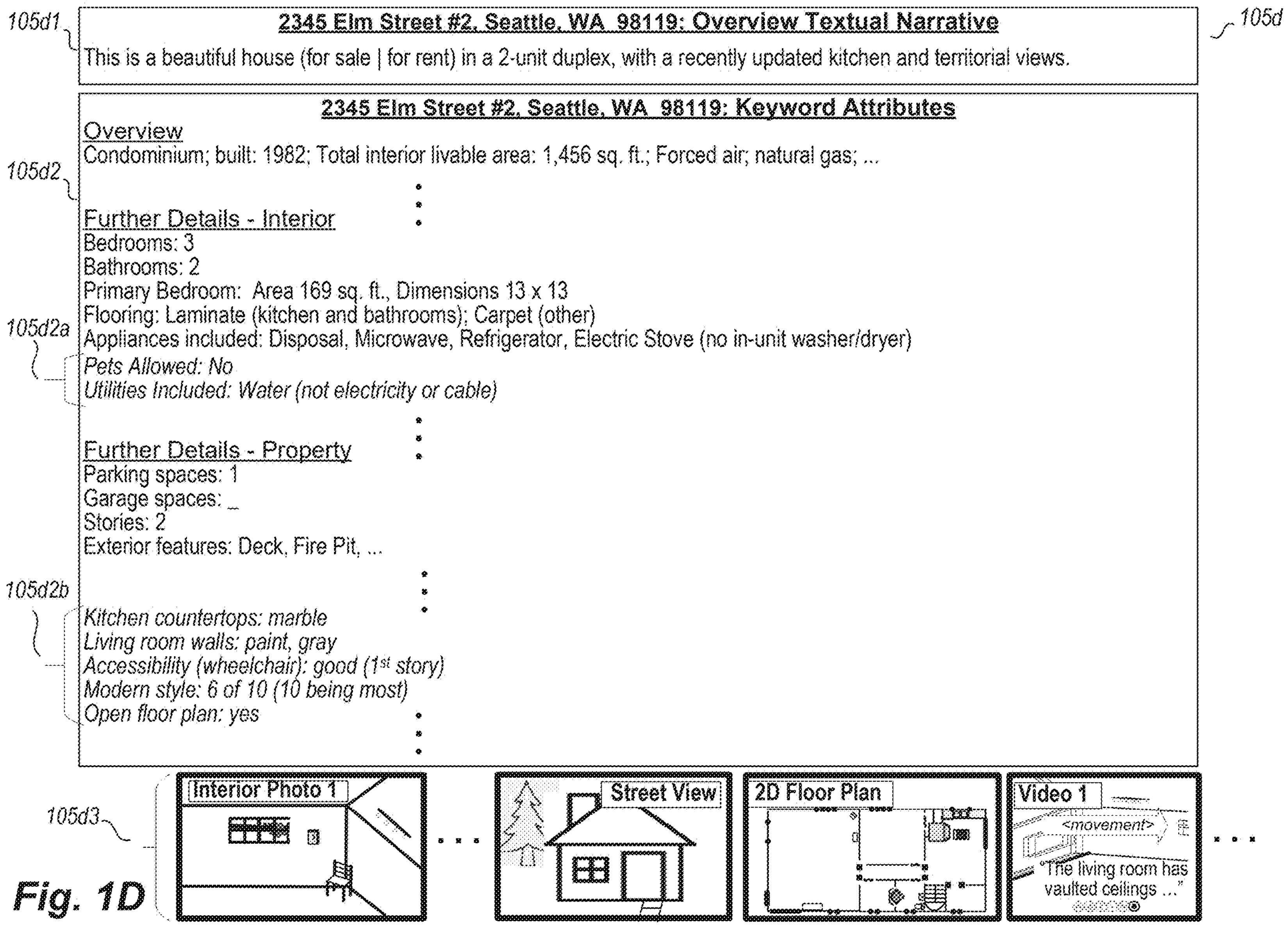
FIG. 1D illustrates examples of non-exclusive types of building description information.

FIGS. 1A-1C are network diagrams illustrating an example system for performing described techniques, including automatically determining and using user-specific dwelling search criteria to provide improved search results.

In particular, FIG. 1A illustrates information 105*a* about an example embodiment of an ADIP system 140 executing on one or more computing systems 300, and interacting over one or more computer networks 100 with one or more client computing devices 360 and their respective users 115—such interactions may include, for example, one or more of the following: to send natural language queries to a user about predicted user-specific dwelling preferences of the user that are based at least in part on a group of dwellings associated with the user; to receive user confirmation and/or denial of predicted user-specific dwelling preferences corresponding to queries sent by the ADIP system, or to otherwise receive user responses that provide changes to the user-specific dwelling preferences and/or to the group of dwellings associated with the user; to receive query requests from users of the client computing devices for information about dwellings and to provide corresponding responses with requested dwelling information (e.g., as part of search results); etc. In this example embodiment, the ADIP system 140 includes several components including an optional ADIP LLM Trainer component 141 that uses training data to generate and/or train one or more LLM models 151 to produce one or more types of real estate-related information, an ADIP Multi-Modal User-Specific Dwelling Data Shared Attributes Analyzer component 142 that uses the trained LLM model(s) 151 to generate shared dwelling attributes 155 for a group of dwellings associated with each of one or more users, an ADIP Input Segment Determiner component 143 that analyzes receives input from a user to attempt to identify segments within the input corresponding to multiple search criteria, an ADIP Candidate Dwelling Evaluator/Selector component 146 that generates corresponding identified dwellings and optionally relevance ratings for a requested user dwelling-related search query, an ADIP Dwelling Information Selection component 148 that selects and generates information specific to identified dwellings to include as part of a search results response, and an ADIP Dwelling Preference Query Generator component 144 that interacts with a user to update user data for the user if appropriate (e.g., to reflect a confirmation or denial of a predicted user-specific dwelling preference, to update the group of dwellings associated with the user, etc.) and to use the one or more trained LLMs 151 to generate a further query for the user about user-specific dwelling preferences of the user along with an optional response to input received from the user, etc.—additional details are included below related to operation of the ADIP system components.

In the illustrated embodiment, the computing systems 300 may store various information on storage 320 that is used by the ADIP system during operation (e.g., in one or more databases), including dwelling data 321 about dwellings in one or more geographical areas (e.g., in one or more countries, states, cities, etc., including information about textual building descriptions of the dwellings and other descriptive dwelling data of one or more other modalities), user data 328 (e.g., user location; a group of multiple dwellings associated with the user, such as based at least in part on prior actions of the user; user-specific dwelling preferences and/or other preferences, such as expressly specified and/or implicitly determined from past activities of the user such as viewing or otherwise interacting with information about dwellings; information from prior and/or concurrent search interaction sessions with the user; etc.), and ADIP system data 327 (e.g., LLM prompt data, LLM training data, search comparison thresholds, predefined keywords, information for use in segment determination such as word-break and/or phrase-break vocabularies, etc.). The ADIP system may further optionally retrieve and use other dwelling-related information 388 of one or more types stored externally to the computing systems 300 (e.g., from one or more public and/or private information sources), such as accessed over the one or more computer networks 100 from one or more external computing and/or storage devices 380, whether in addition to or instead of information stored on storage 320.

As one example of operations of the ADIP system 140, an optional ADIP LLM Trainer component 141 may be in use, and if so it may obtain training data from the ADIP system data 327, and use the data to generate and/or train one or more LLM models 151 to generate one or more types of real estate-related information (e.g., shared dwelling attributes for a group of dwellings associated with a user and resulting predicted user-specific dwelling preferences, queries to provide to a user to obtain confirmation and/or denial of user-specific predicted dwelling preferences and/or other changes to data associated with the user, etc.), as discussed in greater detail elsewhere herein, although in some embodiments the ADIP system may obtain the one or more trained LLMs from one or more external sources (not shown). The ADIP Multi-Modal User-Specific Dwelling Data Shared Attributes Analyzer component 142 uses the trained LLM model(s) 151 to generate shared dwelling attributes 155 for a group of dwellings associated with each of one or more users, such as by identifying a group of dwellings associated with each such user from user data 328, by obtaining textual description information and other descriptive dwelling data for the dwellings from dwelling data 321, and by supplying the obtained descriptive dwelling data to the trained LLM model(s) 151, optionally after manipulating and/or generating some of the information (e.g., analyzing images of that dwelling to generate textual descriptions of them). One example of such a component 142 is discussed in further detail with respect to FIG. 1B.

During further operations of the ADIP system 140, interactions of the ADIP system with a particular user 115 of one of the client computing devices 360 may be initiated in various manners, such as by the ADIP system generating and providing one or more natural language queries to the user about one or more predicted user-specific dwelling preferences of the user (e.g., by displaying the one or more queries to the user in a GUI 199 of an automated chatbot provided by the ADIP system and powered by at least one of the LLMs 151), and/or receiving a query 191 from the user (e.g., a natural language free-form query from the user about dwellings of interest) via the GUI 119 provided by the ADIP system. When the GUI receives input from the user (e.g., a user response to a previously provided ADIP-generated query, a user query from the user about dwellings, etc.), the GUI 119 provides the user input 191 to an ADIP Input Segment Determiner component 143, which analyzes the user input to attempt to identify segments within the input corresponding to multiple search criteria (e.g., to include at least one or more keyword-based query segments and one or more additional query segments that do not include any predefined keywords) or to otherwise identify segments within the input that are part of a user response to a previous ADIP system query (e.g., a confirmation or denial for each of one or more predicted user-specific dwelling preferences, other updates from the user about one or more types of information associated with the user, etc.)—if the component is unable to identify such segments or otherwise parse the user input, such as due to the received input lacking a correct format or types of information or due to having other problems, the component instead generates and returns a clarifying response 193 to the GUI 119 to request further information from the user and/or to indicate an inability to respond. Otherwise, the component 143 determines how to process the determined input segments or other input data 153 based on a type of the input. In particular, in this example, the ADIP system determines 156 if the user input is an initial request from the user to start a chat interaction session, and if so prepares 159 an initial query 197 to send to the user related to dwelling preferences of the user (e.g., with instructions about how to use the chatbot, including how to login or otherwise identify the user if not already known), and sends the query to the user via the GUI 119.

Otherwise, the ADIP system determines 158 if the user input is a query from the user for dwelling information, and if so performs the ADIP Candidate Dwelling Evaluator/Selector component 146 to generate corresponding identified dwellings and optionally relevance ratings 159 (e.g., based at least in part on user-specific dwelling preferences that are included or not included in the search criteria), which are then provided to the ADIP Dwelling Information Selection component 148 to select and generate information specific to the identified dwellings to include as part of a search results response with target dwelling information 195 (e.g., to filter and/or rank the identified dwellings, such as based on the relevance ratings and/or user-specific dwelling preference; to select types of information to include for each dwelling; to format the search results in a particular manner, such as in a list format or overlaid on a map; etc.), with the response 195 provided to the user via the GUI 119. Otherwise, the user input is interpreted as a response to a previous ADIP system query and is provided to the ADIP Dwelling Preference Query Generator component 144, which in this example uses the response data to update corresponding user data 328 for the user if appropriate (e.g., to reflect a confirmation or denial of a predicted user-specific dwelling preference, to update the group of dwellings associated with the user, etc.), and to then use the one or more trained LLMs 151 to generate a further query 197 for the user about user-specific dwelling preferences of the user along with an optional response to the input received from the user (e.g., a query about a different user-specific predicted dwelling preference, a follow-up question to obtain further details about a previous user-specific predicted dwelling preference from a last or earlier query to the user, etc.), with the response 197 similarly provided to the user via the GUI 119. One example of such a component 144 is discussed in further detail with respect to FIG. 1C.

The same user may then provide one or more subsequent queries and/or responses 191 to the GUI 119 as part of an ongoing chat interaction session, such as with similar processing performed by the ADIP system for the subsequent user queries and/or responses, and optionally with the context of prior interactions during the session being maintained and used by the ADIP system (e.g., stored and used to add missing information in later queries and/or responses, such as dwelling type or geographical area or information about user-specific dwelling preferences; etc.). In addition, a user may in some embodiments and situations provide optional user feedback 154, such as to indicate that incorrect search criteria have been determined by the ADIP system for a user query and/or an incorrect understanding by the ADIP system of a user response has occurred based on response information provided to the user, to otherwise provide feedback regarding accuracy of provided queries and/or responses 195 and/or 197, to provide further clarifying information in response to a clarifying response 193, to explicitly specify and supply further user preferences to be used or other changes to user data, etc. If so, such optional user feedback 154 may be forwarded to the components 142 and/or 143 and/or 144 and/or 146 and/or 148, such as to improve future determinations performed by the components or to otherwise update data associated with the user as appropriate. In other embodiments and situations, some or all such feedback may instead be implicit feedback that is determined by the ADIP system based on an analysis of subsequent user queries and/or responses (e.g., to indicate that a prior response from the ADIP system did not provide information that the user was seeking and/or that a prior query from the ADIP system was incorrect or inappropriate in some indicated manner) and/or of prior user queries and/or responses (e.g., to determine user preferences and/or user location, such as based on patterns in the prior user queries). While the example discussed above involves a single user performing multiple interactions with the ADIP system as part of an interaction session (e.g., spanning seconds, minutes, hours, days, etc.), it will be appreciated that the ADIP system may in at least some embodiments and situations be concurrently interacting with many users using different client computing devices, such as to maintain a separate GUI and interaction session history for each such user, and that a new interaction session may be initiated for a user after one or more prior interaction sessions with that user in various manners (e.g., based on a corresponding user instruction, such as to reflect a change in the types of dwelling information or other interactions of interest; as determined automatically by the ADIP system, such as to reflect a change in the types of dwelling information being requested or other type of interaction with the user, or due to a defined period of time since a last user interaction being exceeded, such as one or more days; etc.).

Figure 3:
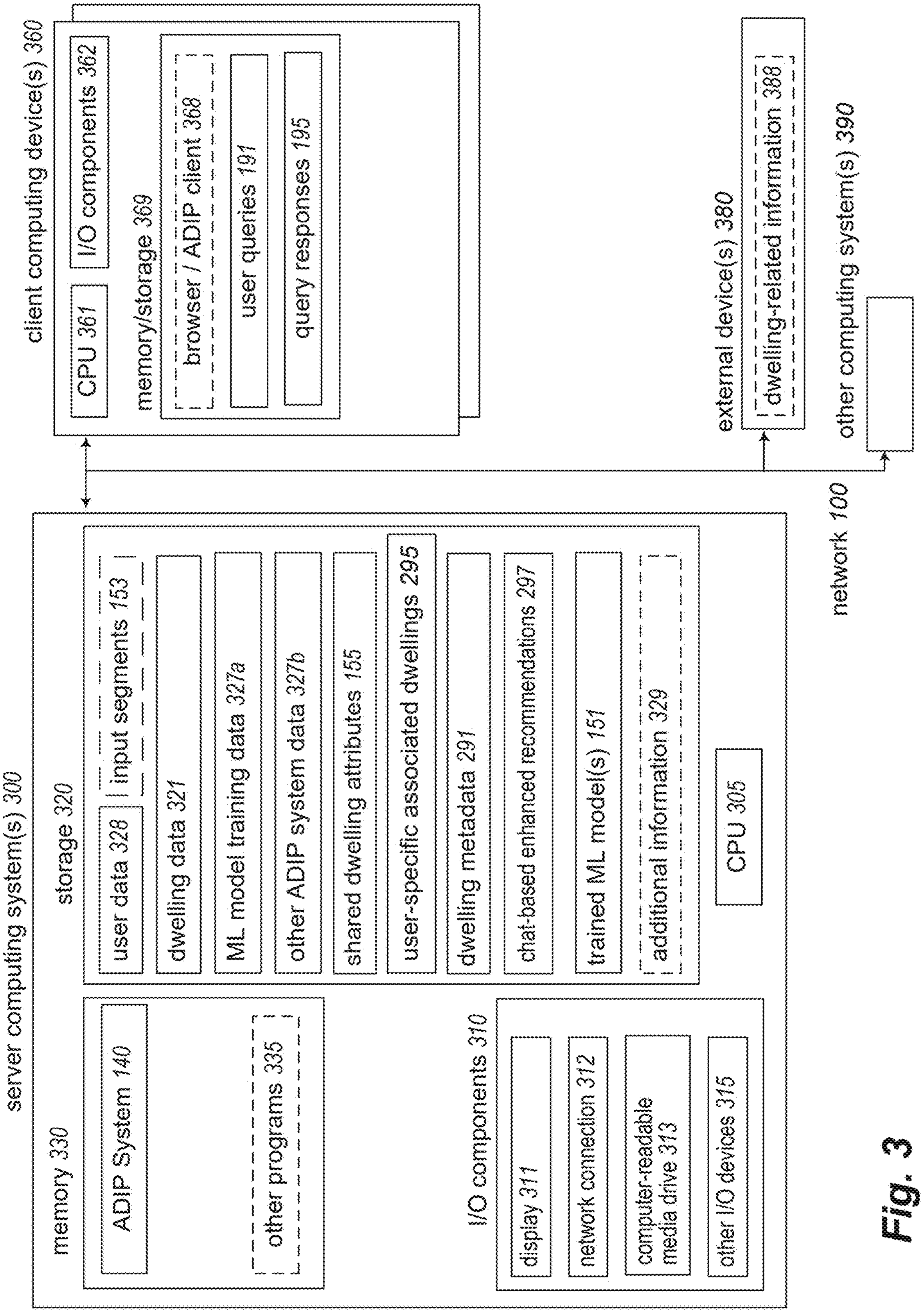
FIG. 3 is a block diagram illustrating an example of a computing system for use in performing described techniques, including automatically determining and using user-specific dwelling search criteria to provide improved search results.

In addition, the computing system(s) 300 may include various other components and functionality, as discussed in greater detail elsewhere herein, including with respect to FIG. 3. The computer networks 100 may similarly be of various types in various embodiments and may include various types of wired and/or wireless segments, including one or more publicly accessible linked networks (e.g., operated by various distinct parties, such as the Internet) and/or a private network (e.g., a corporate or university network that is wholly or partially inaccessible to non-privileged users), including in some cases to have both private and public networks (e.g., with one or more of the private networks having access to and/or from one or more of the public networks).

FIG. 1B continues the example of FIG. 1A, and illustrates information 105*b* for one example embodiment of the ADIP Multi-Modal User-Specific Dwelling Data Shared Attributes Analyzer component 142 discussed in FIG. 1A. In particular, the component 142 performs various activities in the illustrated embodiment to generate shared dwelling attributes 155 for a group of dwellings associated with each of one or more users.

In operation, the component 142 receives as input at least some of the user data 328, dwelling data 321, and ADIP system data 327. In block 162, the component then determines or selects a particular user (e.g., selects a first user of some or all users), and retrieves user-specific dwelling data for multiple dwellings associated with that user. In block 163, the component then determines whether there is visual data for two or more of the multiple dwellings to be analyzed, and if so continues to block 164 to determine one or more LLM prompts to cause the one or more LLMs 151 to generate information about shared attributes among the images and/or other visual data of the multiple dwellings (e.g., using one or more predefined prompts in the ADIP system data), supplies the visual data and each determined prompt to the one or more LLMs (e.g., consecutively if there are multiple prompts), and obtains determined shared attributes (if any) in the visual data for the dwellings from the one or more LLMs. After block 164, or if it is determined in block 163 not to analyze visual data, the component in block 165 determines whether there is descriptive textual data for two or more of the multiple dwellings to be analyzed, and if so continues to block 166 to determine one or more LLM prompts to cause the one or more LLMs 151 to generate information about shared attributes among the descriptive textual data for the multiple dwellings (e.g., using one or more predefined prompts in the ADIP system data), supplies the textual description data and each determined prompt to the one or more LLMs (e.g., consecutively if there are multiple prompts), and obtains determined shared attributes (if any) in the descriptive textual data for the dwellings from the one or more LLMs. After block 166, or if it is determined in block 165 not to analyze descriptive textual data, the component in block 167 determines whether there is other descriptive data for two or more of the multiple dwellings of one or more other modalities to be analyzed (e.g., floor plans or other computer models, descriptive audio data, etc.), and if so continues to block 168 to determine one or more LLM prompts to cause the one or more LLMs 151 to generate information about shared attributes among the other descriptive data for the multiple dwellings (e.g., using one or more predefined prompts in the ADIP system data), supplies the other description data and each determined prompt to the one or more LLMs (e.g., consecutively if there are multiple prompts), and obtains determined shared attributes (if any) in the other descriptive data. After block 168, or if it is determined in block 167 not to analyze other descriptive data, the component in block 170 optionally determines a priority or other ranking among determined shared dwelling attributes (if multiple) for the user, such as using corresponding data provided by the LLM(s) 151 in response to corresponding prompting and/or predefined ADIP system data 327. The shared attributes determined in blocks 164, 166 and/or 168 are then stored as shared dwelling attributes 155 for the user along with any user-specific attribute priority or ranking information, and optionally used as predicted user-specific dwelling preference data for the user if not already reflected in the user-specific dwelling preference data. After block 170, the component in block 169 determines if there are more users for which to analyze shared dwelling data attributes, and if so returns to block 162 to determine or select the next such user, and otherwise returns.

FIG. 1C continues the examples of FIGS. 1A and 1B, and illustrates information 105*c* for one example embodiment of the ADIP Dwelling Preference Query Generator component 144 discussed in FIG. 1A, which in this example uses the one or more trained LLMs 151 to generate a query 197 for a user about user-specific dwelling preferences of the user and to optionally analyze and use user-supplied information (e.g., in response to a prior generated query 197).

In operation, the component 144 receives as input at least some of the user data 328, ADIP system data 327, and optionally dwelling data 321, as well as user-specific shared dwelling attributes 155 for a particular user (e.g., as previously determined by the ADIP Multi-Modal User-Specific Dwelling Data Shared Attributes Analyzer component 142). In particular, the component in block 181 receives information from the user (e.g., from a chat interaction session), and determines if the user is a registered user that has stored user-specific data or if the component otherwise has user-specific data for the user from previous user interactions (e.g., from an ongoing Interaction session). The component then determines 183 whether the user is known and the information received from the user includes user-supplied information related to one or more dwelling preferences of the user, and if so in block 185 determines one or more user-specific dwelling preferences indicated by the user and updates corresponding information for the user accordingly, as well as to optionally generate a response to provide to the user about the update being performed along with query 197. Otherwise, the component in block 187 stores other user-supplied information as appropriate if the user is known, such as for a different type of preference of the user, about a group of multiple dwellings associated with the user (e.g., to update the group to remove or add one or more dwellings), etc., or otherwise associates user-supplied information with an unknown user for possible later use in an ongoing interaction session. After blocks 185 or 187, the component determines 171 if the user has associated user-specific shared dwelling attributes, such as for a registered user for which such information was previously determined by the ADIP Multi-Modal User-Specific Dwelling Data Shared Attributes Analyzer component 142. If so, the component retrieves the user-specific shared dwelling attribute data 155 and other user-specific dwelling preference data if available along with associated dwelling data in block 173, and, in block 175, selects at least one of the shared dwelling attributes to use as a predicted user-specific dwelling preference (e.g., a shared dwelling attribute for which user-specific dwelling preference data is not already available, and optionally in a random manner or otherwise based on defined priority information from the ADIP system data or generated by the component 142), determines one or more LLM prompts to cause the one or more LLMs 151 to generate a query to the user to obtain more information from the user about user dwelling preferences associated with the selected one or more shared dwelling attributes, supplies each determined prompt and optionally associated selected shared dwelling attributes to the one or more LLMs (e.g., consecutively if multiple prompts), obtains one or more generated queries for the user from the LLMs, and selects one of the generated queries to supply to the user (e.g., in a random manner, based on defined priority information for an associated shared dwelling attribute, etc.). If the user does not have associated user-specific shared dwelling attributes, the component instead determines 172 if there are multiple associated dwellings with the user (e.g., from prior interactions with the user during the interaction session), and if not in block 177 generates a query for the user to provide user-specific dwelling preference data (e.g., a predefined query from the ADIP system data 327) and selects the query for further use, and otherwise in block 174 invokes the ADIP Multi-Modal User-Specific Dwelling Data Shared Attributes Analyzer component 142 to determine shared dwelling attributes in descriptive data for the multiple associated dwellings before further proceeding to block 175. After blocks 175 or 177, the resulting generated query 197 about the user-specific dwelling preferences and optional response for the user is provided as output.

FIG. 1D illustrates examples of non-exclusive types of descriptive dwelling data 105*d* that may be available in some embodiments for an example dwelling (in this example, a house available for either rental and/or purchase), such as existing building information that is analyzed and used by the ADIP system. In the example of FIG. 1D, the descriptive dwelling data 105*d* includes an overview textual narrative description 105*d*1, various keyword attribute data 105*d*2, and various associated digital media items or other content pieces 105*d*3, such as may be used in part or in whole as listing information for an MLS (multiple listing service) system. In this example, the attribute data is grouped into sections (e.g., overview attributes, further interior detail attributes, further property detail attributes, etc.), with most of the attribute data specified using keyword-value pairs each having a keyword and at least one corresponding value (although other attributes may be specified using a keyword without any associated values, such as based on the presence or absence of a keyword such as "deck" or "pool"), but in other embodiments the attribute data may not be grouped or may be grouped in other manners and may be specified in other manners, including for the dwelling occupancy description information to not be separated into a list of attributes and a separate overview textual narrative description. In this example, the separate overview textual narrative description emphasizes characteristics that may be of interest to viewers, such as a dwelling style type, information of interest about rooms and other dwelling characteristics (e.g., that have been recently updated or have other characteristics of interest), information of interest about the property and surrounding neighborhood or other environment, etc. In addition, in this example, the attribute data includes objective attributes of a variety of types about rooms and the dwelling and limited information about appliances, but may lack details of various types shown in italics in this example for attributes 105*d*2*b* (e.g., about subjective attributes, about inter-room connectivity and other adjacency, about other particular structural elements or objects and about attributes of such objects, etc.), such as may instead be determined by the ADIP system via analysis of building images and/or other building information (e.g., floor plans), and/or may lack details of various types shown in italics in this example for attributes 105*d*2*a* (e.g., about attributes associated with rental usage policies, such as if the dwelling is only available for acquisition). In addition, in this example, the digital media items or other content pieces 105*d*3 include multiple dwelling images (both inside and outside in this example), a 2D floor plan, at least one video, but do not illustrate various other types of digital media items (e.g., audio clips, a 3D computer model, a virtual tour of inter-linked images through which a viewer may progress in a user-selected and/or automated manner, additional images and/or video clips, etc.), although such other types of digital media items may be present and used by the ADIP system (e.g., analyzed by the ADIP Multi-Modal User-Specific Dwelling Data Shared Attributes Analyzer component 142 to determine shared attributes in descriptive data for multiple dwellings associated with a user).

It will be appreciated that various details are provided with respect to FIGS. 1A-1D for illustrative purposes, and are not intended to limit the scope of the invention unless otherwise indicated. Similarly, additional exemplary details are provided with respect to FIGS. 2A-2E and elsewhere herein, and such details are similarly provided for illustrative purposes and are not intended to limit the scope of the invention unless otherwise indicated.

FIGS. 2A-2E illustrate examples of performing described techniques, including automatically determining and using user-specific dwelling search criteria to provide improved search results.

Figure 2A:
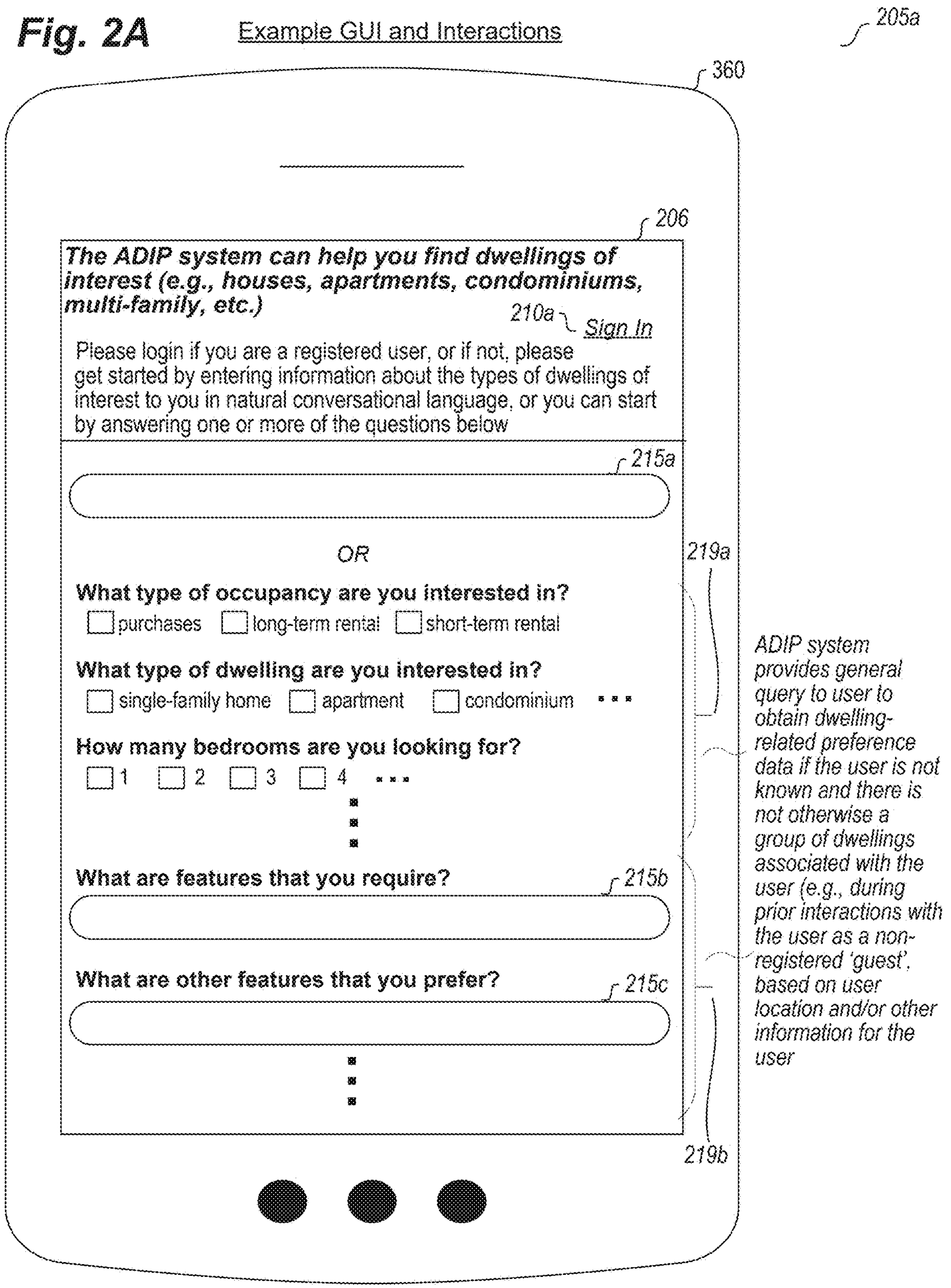
FIGS. 2A-2E illustrate examples of performing described techniques, including automatically determining and using user-specific dwelling search criteria to provide improved search results.

In particular, FIG. 2A illustrates information 205*a* including an example client computing device 360 (in this example, a smartphone) that is being used by a user (not shown) to interact with an automated chatbot GUI provided by the ADIP system, with current information 206 displayed in the GUI. In this example, a chat interaction session with the user is just beginning, and an initial greeting screen is shown that includes a user selectable control 210*a* via which a user may sign in, as well as instructions regarding how to interact with the GUI, including a request for the currently unknown user to sign in so that the ADIP system can retrieve previously obtained and stored information for the user, or for the user to instead provide information about dwelling preferences of the user if not previously obtained. In this example, the GUI provides an input area 215*a* via which the user may supply a natural language description of types of dwellings of interest to the user, as well as a series of questions 219*a* and/or 219*b* that the user can answer (e.g., using input areas 215*b* and 215*c*), whether instead of or in addition to using the input area 215*a*. It will be appreciated that information about dwelling preferences of the user may be gathered in other manners in other embodiments.

Figure 2B:
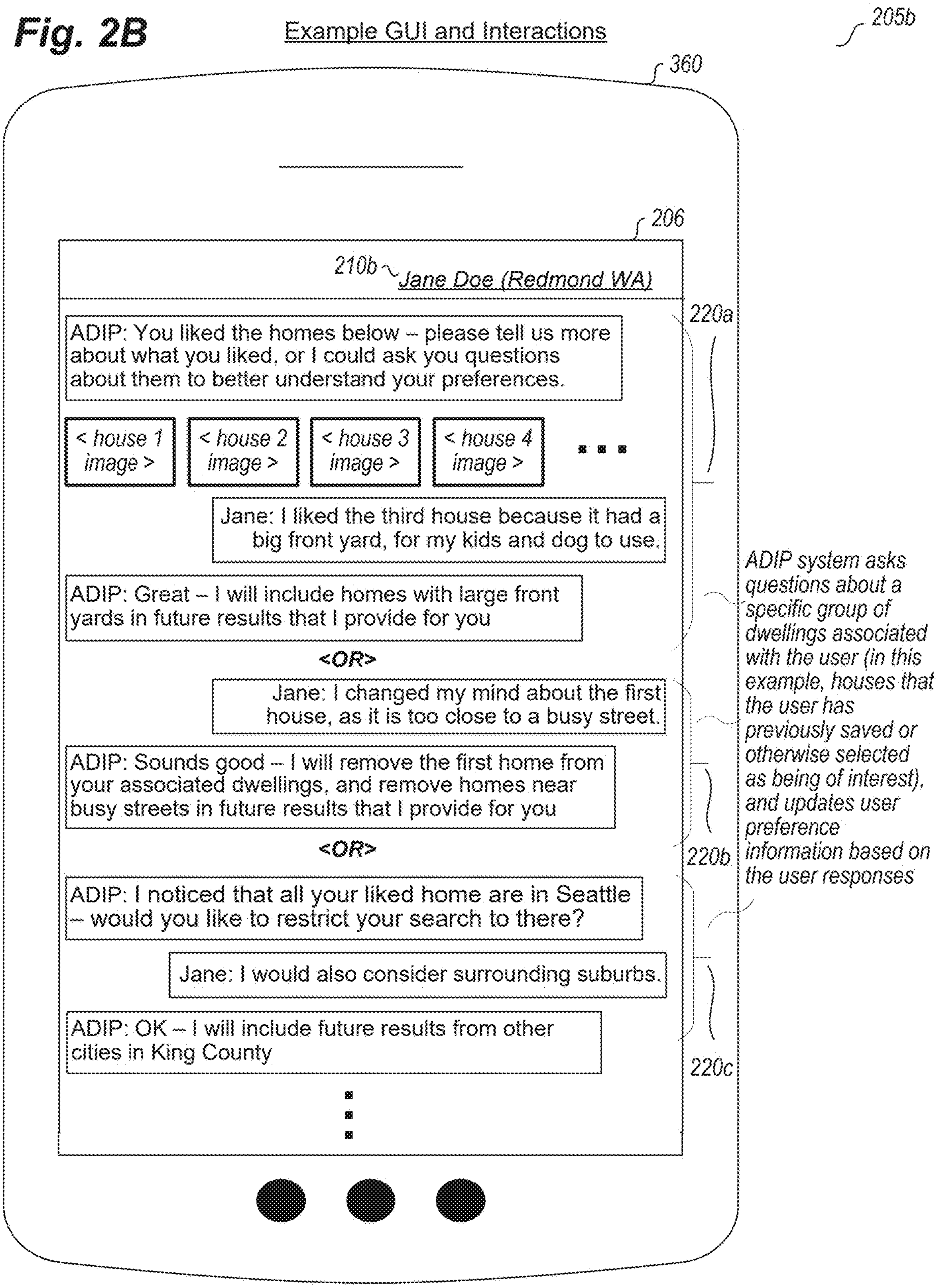

FIG. 2B continues the example of FIG. 2A, and illustrates information 205*b* showing 210*b* that the user has used the control 210*a* of FIG. 2A to sign in, allowing the ADIP system to retrieve information about a group of multiple dwellings previously associated with the user (not shown), and to use that information about the group of associated dwellings to predict corresponding user-specific dwelling preferences of the user. In particular, in the example of FIG. 2B, the ADIP system may participate in a sequence of interactions 220*a* that includes presenting information about some or all of the group of dwellings associated with the user and providing a corresponding query to the user about why the user previously selected the dwellings, receiving response feedback from the user about why one or more of the dwellings were previously selected by the user, and providing a further corresponding response from the ADIP system to the feedback from the user—as reflected in the corresponding response from the ADIP system, the system may use the information provided by the user to update the user-specific dwelling preference information for the user to include a preference for large front yards. While the dwellings presented in this example were previously selected by the user, similar information about other dwellings associated with the user may be similarly used in other embodiments and situations, such as for a group of dwellings recommended for the user (whether by the ADIP system or another system), a group of dwellings located in the same geographical user of the user, etc. In addition to or instead of the sequence of interactions 220*a*, the ADIP system may participate in a sequence of interactions with the user that includes interactions 220*b*, including response information from the user to reflect a change in the group of dwellings associated with the user (such as instead of or in addition to the user response of interactions 220*a* related to the large front yard), along with providing a corresponding response from the ADIP system to that user response information—as reflected in the corresponding response from the ADIP system, the system may use the information provided by the user to update the group of dwellings associated with the user, as well as to update the user-specific dwelling preference information for the user to include a negative preference for dwellings near busy streets. In addition to or instead of the sequences of interactions 220*a* and/or 220*b*, the ADIP system may participate in a sequence of interactions with the user that includes interactions 220*c*, including the query from the ADIP system about a user-specific dwelling preference of the user for a particular geographical area (in this example, the city of Seattle) based on the group of dwellings associated with the user, with response information from the user indicating a confirmation of that geographical area along with additional geographical areas of interest to the user, and with the ADIP system providing a corresponding response to that user-supplied response information—as reflected in the corresponding response from the ADIP system, the system may use the information provided by the user to update a user-specific dwelling preference for the user associated with geographical search areas to use for the user.

Figure 2C:
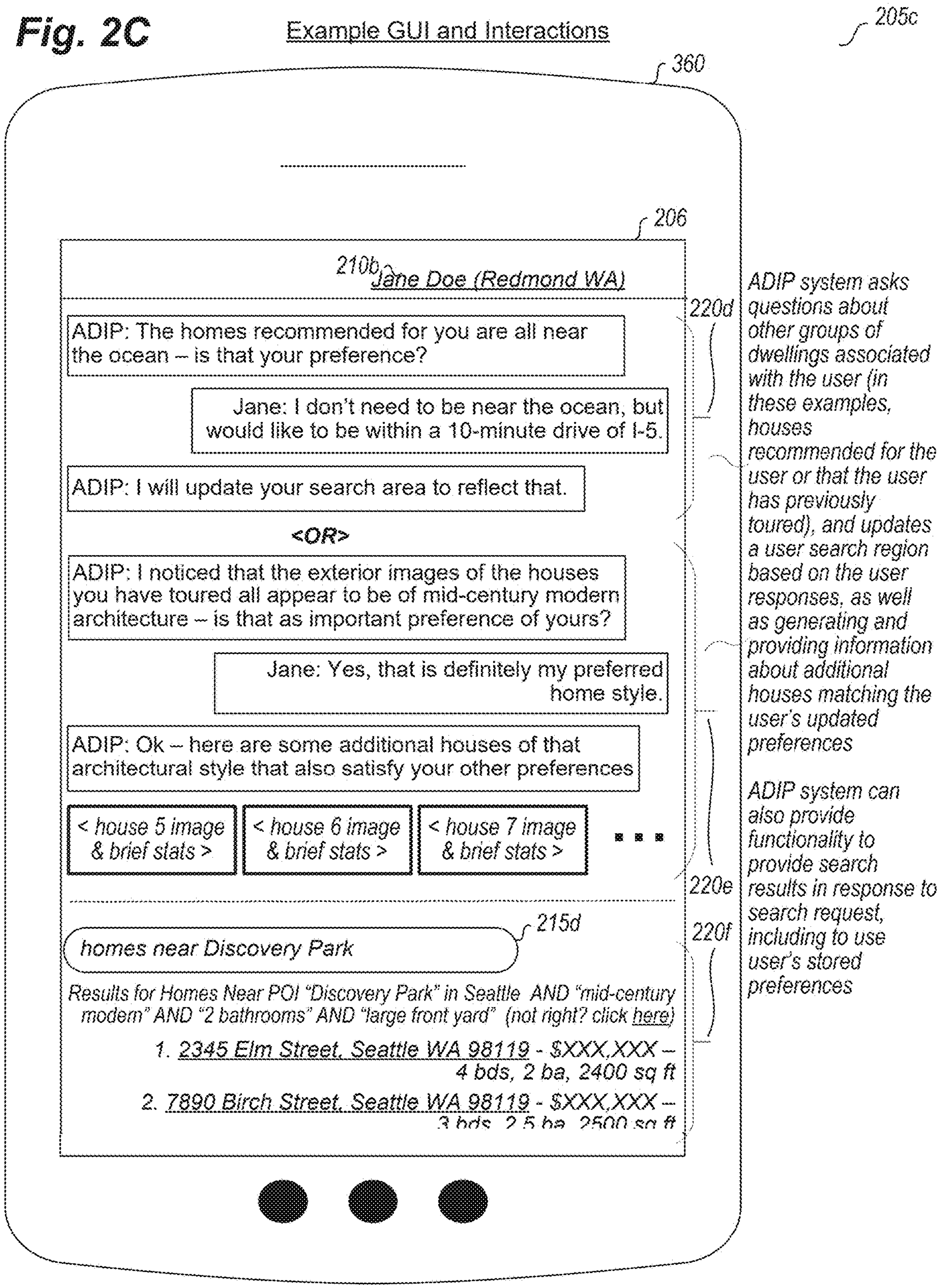

FIG. 2C continues the examples of FIGS. 2A-2B, and illustrates information 205*c* showing additional interactions 220*d* and/or 220*e* and/or 220*f* that may occur between the ADIP system and the user. In particular, the example interactions 220*d* include the ADIP system indicating a predicted user-specific dwelling preference for the user corresponding to dwellings near a POI category (in this example, the ocean) based on the group of dwellings associated with the user, along with receiving corresponding response information from the user to deny the predicted user-specific dwelling preference for the user but to provide an alternative dwelling preference (in this example, to further refine the geographical search area based on a driving distance limit from an indicated freeway), and with a corresponding response from the ADIP system—as reflected in the corresponding response from the ADIP system, the system may use the information provided by the user to update the geographical search area(s) for the user. In addition, the example interactions 220*e* include the ADIP system identifying a predicted user-specific dwelling preference based on analysis of visual data for the group of dwellings associated with the user (in this example, an architectural style of houses), along with response information from the user indicating a confirmation of the predicted user-specific dwelling preference, and with further response information from the ADIP system—as reflected in the corresponding response from the ADIP system, the system may use the information provided by the user to update the user-specific dwelling preferences of the user. The example interactions 220*f* further include a user supplying a natural language search query via the GUI in area 215*d* for information about dwellings matching specified search criteria (in this example, homes near an indicated POI that is a named park), and with the ADIP system interpreting the supplied search query using the current user-specific dwelling preferences of the user (e.g., to interpret the POI name based on the geographical search area of Seattle and surrounding suburbs, to include a large front yard, etc.), and providing corresponding search results in list form that the user may further interact with to obtain additional details (e.g., by selecting one of the displayed search results to obtain further detail specific to a corresponding dwelling). It will be appreciated that information about interactions with a user regarding user-specific dwelling preferences of the user may be performed in other embodiments in manners other than the examples of FIGS. 2B and 2C.

Figure 2D:
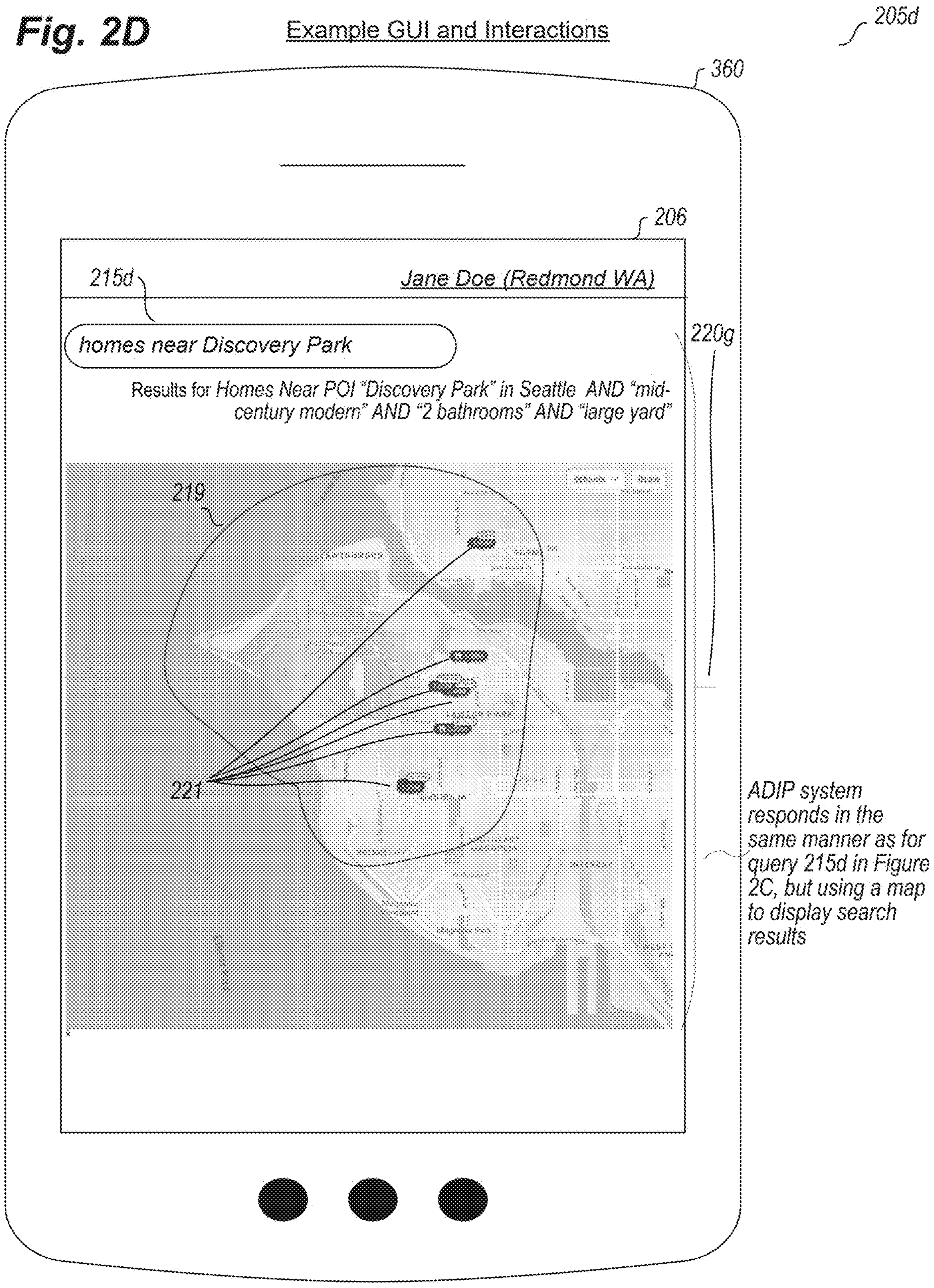

FIG. 2D continues the examples of FIGS. 2A-2C, and illustrates information 205*d* showing an alternative response to the user-supplied search query in the interactions 220*f* of FIG. 20, in which the search response information 220*g* in FIG. 2D is provided in the form of a map that includes a visual indicator 219 of the POI-specific geographical search region used for the Discovery Park POI location, and with the search results shown as visual indicators 221 overlaid on the map for each candidate dwelling, which in this example are user-selectable controls with which the user can select to obtain more information about a respective dwelling. It will be appreciated that in this example the POI-specific nearby geographical region for the Discovery Park POI location has been determined to have a shape that is nonuniform but that is roughly based on the shape of the POI location itself, although with different distances from the boundary of the park being used in different spots (e.g., based on one or more associated attributes for that POI location and/or for the dwellings, such as to include dwellings from which the park can be reached within a defined amount of time, etc.), while in other embodiments the geographical region may be determined in other manners (e.g., a uniform geometrical shape; the same shape as the POI location but larger on some or all sides; such as all sides with land and/or dwellings; etc.).

Figure 2E:
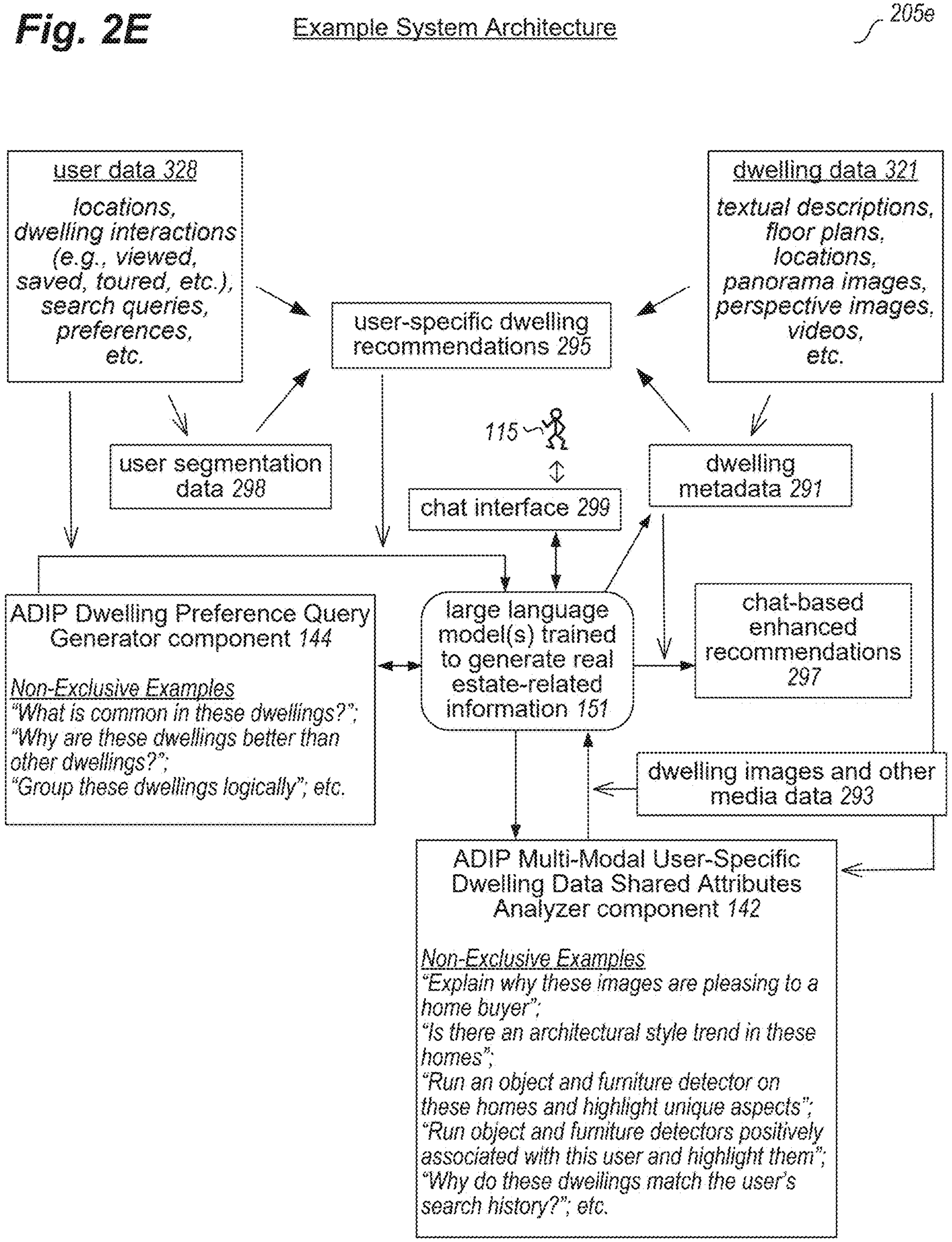

FIG. 2E continues the examples of FIGS. 2A-2D, and illustrates information 205*e* showing an example system architecture for at least a portion of the ADIP system along with additional data that may be used by the ADIP system. In this example, various user data 328 and dwelling data 321 may be used to generate user-specific dwelling recommendations 295 for each of one or more users (whether by the ADIP system or by another system, not shown), such as to provide at least some dwellings for each such user that are used by the ADIP system as a group of multiple dwellings associated with that user. In addition, the user data 328 may be used in this example embodiment to produce user segmentation data 298 (e.g., to group users by common attributes, such as demographic information, geographical locations, etc.), which may be further used as part of generating the user-specific dwelling recommendations 295. Similarly, the initial dwelling data 321 may be used in this example embodiment to produce dwelling metadata 291 (e.g., to generate further descriptive information for dwelling based on analysis of other descriptive data for the dwelling, such as to analyze images of the dwelling to produce corresponding textual descriptions and/or a floor plan or other computer model; to group dwellings by common attributes; etc.), which may also be further used as part of generating the user-specific dwelling recommendations 295. If such dwelling recommendations 295 are available, they may be used in some embodiments and situations by the ADIP system as at least some of the dwellings associated with a particular user, while in other embodiments and situations no such dwelling recommendations may be generated and/or used in this manner.

The example system architecture for at least a portion of the ADIP system that is illustrated in FIG. 2E includes the ADIP Dwelling Preference Query Generator component 144 and the ADIP Multi-Modal User-Specific Dwelling Data Shared Attributes Analyzer component 142, along with one or more trained LLMs 151. In this example, the ADIP system uses an automated chatbot (not shown) to provide a chat interface 299 to interact with a user in order to obtain determined user-specific dwelling preferences (e.g., in a manner similar to that discussed with respect to FIGS. 2A-2C), and may further use those user-specific dwelling preferences to produce chat-based enhanced dwelling recommendations 297 for the user (e.g., to improve initial dwelling recommendations 295). As discussed in greater detail elsewhere herein, the chat interface 299 uses information determined by the component 142 (from analyzing dwelling images and other modes of descriptive dwelling data 293 for a group of multiple dwellings associated with the user to determine shared dwelling attributes of those dwellings, and to identify corresponding predicted user-specific dwelling preferences), with non-exclusive examples of types of LLM prompts that may be used by the component 142 being illustrated. In addition, as discussed in greater detail elsewhere herein, the chat interface 299 further uses information determined by the component 144 (by using the determined predicted user-specific dwelling preferences for a user to perform interactions with the user via the chat interface 299 in order to confirm or deny those user-specific dwelling preferences and to optionally obtain additional details from the user about preference data specific to the user, such as by using the LLM(s) 151 to select particular shared dwelling attributes and generate corresponding user queries), with non-exclusive examples of types of LLM prompts that may be used by the component 144 being illustrated. Additional details are included elsewhere herein regarding example architecture and operations of embodiments of the ADIP system.

It will be appreciated that the examples of FIGS. 2A-2E are provided for illustrative reasons only, and are not intended to limit the scope of the invention. For example, a variety of other combinations of natural language free-form search terms may be used in other embodiments and situations.

For illustrative purposes, some embodiments are described herein in which specific types of information are acquired, used and/or presented in specific ways using specific types of data structures and by using specific types of devices—however, it will be understood that the described techniques may be used in other manners in other embodiments, and that the invention is not limited to exemplary details provided. As one non-exclusive example, specific types of data structures and algorithms are generated and/or used in specific manners in some embodiments, but it will be appreciated that other types of information may be generated and used in other manners in other embodiments, including for types of information other than dwelling information. Similarly, while particular user interface display and interaction techniques are shown, other user interaction techniques may be used in other embodiments. In addition, various details are provided in the drawings and text for exemplary purposes, but are not intended to limit the scope of the invention—for example, sizes and relative positions of elements in the drawings are not necessarily drawn to scale, with some details omitted and/or provided with greater prominence (e.g., via size and positioning) to enhance legibility and/or clarity, and identical reference numbers may be used in the drawings to identify the same or similar elements or acts.

FIG. 3 is a block diagram illustrating an embodiment of one or more server computing systems 300 executing an implementation of an ADIP system 140, such as in a manner similar to that of FIGS. 1A-1C and FIGS. 2A-2E and with additional hardware details illustrated—the server computing system(s) and ADIP system may be implemented using a plurality of hardware components that form electronic circuits suitable for and configured to, when in combined operation, perform at least some of the techniques described herein. In the illustrated embodiment, each server computing system 300 includes one or more hardware central processing units ("CPU") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.).

The server computing system(s) 300 and executing ADIP system 140 may communicate with other computing systems and devices via one or more networks 100 (e.g., the Internet, one or more cellular telephone networks, etc.), such as user client computing devices 360 (e.g., used to receive and display information from the ADIP system, to send user-supplied queries and/or other information to the ADIP system; to optionally further use received information, such as to implement further automated activities such as to access other functionality provided by the ADIP system), optionally other external devices 380 (e.g., used to store and provide dwelling information of one or more types), and optionally other computing systems 390.

In the illustrated embodiment, an embodiment of the ADIP system 140 executes in memory 330 in order to perform at least some of the described techniques, such as by using the processor(s) 305 to execute software instructions of the system 140 in a manner that configures the processor(s) 305 and computing system 300 to perform automated operations that implement those described techniques. The illustrated embodiment of the ADIP system may include one or more components, not shown, to each perform portions of the functionality of the ADIP system, and the memory may further optionally execute one or more other programs 335. The ADIP system 140 may further, during its operation, store and/or retrieve various types of data on storage 320 (e.g., in one or more databases or other data structures), such as various types of user data 328, dwelling data 321 (e.g., textual dwelling description data), ML model training data 327*a*, other ADIP system data 327*b*, shared dwelling attributes 155, user-specific associated dwellings 295, dwelling metadata 291, chat-based enhanced recommendations 297, trained LLM model(s) 151, optionally input segments 153, and/or various other types of optional additional information 329.

Some or all of the user client computing devices 360 (e.g., mobile devices), external devices 380, and other computing systems 390 may similarly include some or all of the same types of components illustrated for server computing system 300. As one non-limiting example, the computing devices 360 are each shown to include one or more hardware CPU(s) 361, I/O components 362, and memory and/or storage 369, with a browser and/or ADIP client program 368 optionally executing in memory to interact with the ADIP system 140 and present or otherwise use query responses 195 that are received from the ADIP system for submitted user queries 191. While particular components are not illustrated for the other devices/systems 380 and 390, it will be appreciated that they may include similar and/or additional components.

It will also be appreciated that computing system 300 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated ADIP system 140 may in some embodiments be distributed in various components, some of the described functionality of the ADIP system 140 may not be provided, and/or other additional functionality may be provided.

It will also be appreciated that, while various items are illustrated as being stored in memory or on storage while being used, these items or portions of them may be transferred between memory and other storage devices, such as for purposes of execution, memory management, data integrity, etc. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the ADIP system 140 executing on server computing systems 300) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

FIG. 4 is a flow diagram of an example embodiment of an ADIP system routine 400. The routine may be provided by, for example, execution of the ADIP system 140 of FIGS. 1A-1D and/or the ADIP system 140 of FIG. 3, and/or corresponding functionality discussed with respect to FIGS. 2A-2E and elsewhere herein, such as to perform automated operations to provide a computer-implemented method related to automatically determining and using user-specific dwelling search criteria to provide improved search results. In the illustrated embodiment, the routine interacts with a single user at a time, but it will be appreciated that the routine may interact in a similar manner with multiple users (e.g., sequentially or concurrently), and that the routine may in other embodiments perform similar types of activities for other types of information.

In the illustrated embodiment, the routine 400 begins at 405, where it receives instructions or other information. In block 410, the routine then determines whether the instructions or other information of block 405 indicate to train one or more LLMs for later use, and if so proceeds to block 415 to obtain corresponding real estate-related training data and to train one or more LLMs using the training data. After block 415, or if it is instead determined in block 410 that the instructions or other information received in block 405 are not to train one or more LLMs, the routine continues to block 420 to determine whether the instructions or other information of block 405 indicate to determine user-specific shared dwelling attributes for each of one or more users, and if so proceeds to block 425 to perform an ADIP Multi-Modal User-Specific Dwelling Data Shared Attributes Analyzer routine to perform such determinations, with one example of such a routine discussed in further detail with respect to FIG. 5.

After block 425, or if it is instead determined in block 420 that the instructions or other information received in block 405 are not to determine user-specific shared dwelling attributes for each of one or more users (e.g., if such determinations were previously performed), the routine continues to block 430 to determine whether to perform a chat interaction session with a user to determine user-specific dwelling preferences of the user based at least in part on determined user-specific shared dwelling attributes for dwellings associated with that user, and if so then proceeds to perform blocks 435-475, and otherwise continues to block 490. In particular, the routine in block 435 prepares an initial query related to dwelling preferences of the user, and in block 440 displays a chat interaction session GUI for use in obtaining user-specific dwelling preference data from the user and optionally receiving and responding to user queries related to dwellings, and displays the prepared initial query and optionally further instructions related to chat session usage along with a login option in the displayed GUI. In block 445, the routine then waits for and receives user input, and determines in block 450 if the user input is a login activity, and if so proceeds to block 445 to retrieve user-specific dwelling preference data and shared dwelling attribute data for the user. After block 455, or if it is instead determined in block 450 that the user input of block 445 is not a user login (e.g., if the user is already logged in, if the user proceeds as a guest user without a login, etc.), the routine continues to block 460 to determine if the user input in block 445 includes a query from the user for dwelling-related information (e.g., a search query), and if so proceeds to block 465 to identify and retrieve matching dwelling data for the query (including using user preference data if appropriate) and to display the matching dwelling data. Otherwise, the routine proceeds to block 470 to perform an ADIP Dwelling Preference Query Generator routine to generate a query about the user's dwelling preferences (e.g., based on the determined shared dwelling attributes for the user) and optionally generates response information to information received from the user in the user input of block 445, and in block 475 displays the generated query and (if received) the generated response information. After blocks 465 or 475, the routine continues to block 485 to determine whether to continue with the chat interaction session with the user, such as until an explicit indication to terminate is received (or alternatively only if an explicit indication to continue is received)—if it is determined to continue, the routine returns to block 445 to await further information or instructions from the same user, and if not continues to block 495.

If it is instead determined in block 430 that the received instructions or other information from block 405 is not to perform a chat interaction session, the routine in block 490 proceeds to perform one or more other indicated operations as appropriate, with non-exclusive examples of such other operations including retrieving and providing previously determined or generated information (e.g., determined user-specific shared dwelling attributes for particular users, determined user-specific dwelling preferences for particular users, previous user queries, previously determined responses to user queries, etc.), receiving and storing information for later use (e.g., information about dwelling data 321, user data 328, ADIP system data 327, etc.), responding to other types of search queries or other queries, receiving and using feedback from a user in response to system-provided queries and/or query responses, providing information about how one or more previous query responses were determined, performing housekeeping operations, etc.

After blocks 485 or 490, the routine continues to block 495 to determine whether to continue, such as until an explicit indication to terminate is received (or alternatively only if an explicit indication to continue is received). If it is determined to continue, the routine returns to block 405 to await further information or instructions, and if not continues to block 499 and ends.

Figure 5:
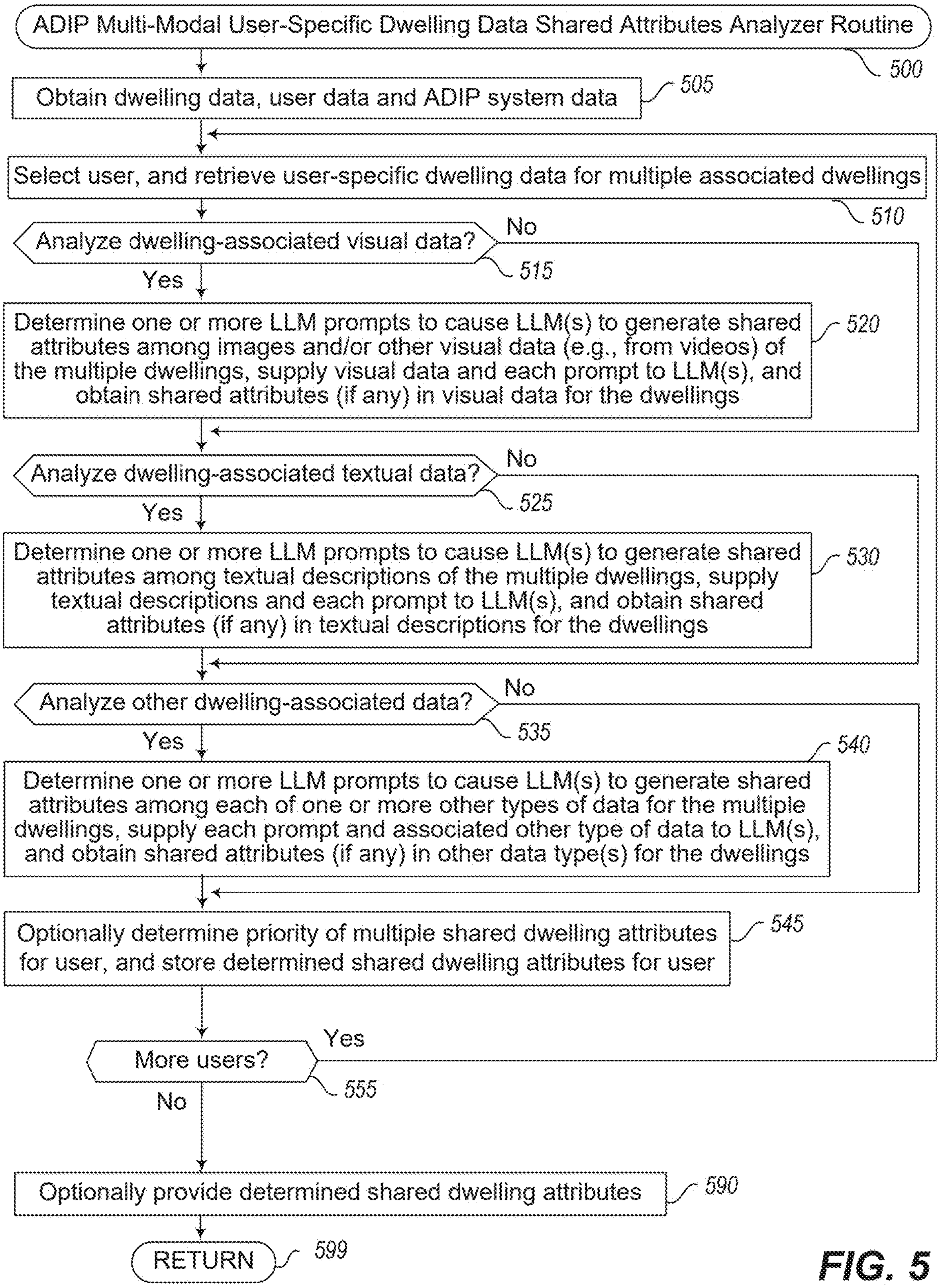
FIG. 5 illustrates a flow diagram of an example embodiment of an ADIP Multi-Modal User-Specific Dwelling Data Shared Attributes Analyzer component routine.

FIG. 5 is a flow diagram of an example embodiment of an ADIP Multi-Modal User-Specific Dwelling Data Shared Attributes Analyzer routine 500. The routine may be provided by, for example, execution of the ADIP Multi-Modal User-Specific Dwelling Data Shared Attributes Analyzer component 142 of FIGS. 1A-1D and/or a corresponding component (not shown) of the ADIP system 140 of FIG. 3 and/or with respect to corresponding functionality discussed with respect to FIGS. 2A-2E and elsewhere herein, such as to perform automated operations to provide a computer-implemented method to generate shared dwelling attributes for a group of dwellings associated with each of one or more users. In addition, in at least some situations, the routine 500 may be performed based on execution of block 425 of FIG. 4, with resulting information provided and execution control returning to that location when the routine 500 ends—in other embodiments, the routine may be invoked in other manners. In this example, the routine 500 is performed using particular ways to generate shared dwelling attributes for a group of dwellings associated with a user by analyzing particular types of descriptive dwelling data in particular ways, but in other embodiments may use other techniques to generate shared dwelling attributes for a group of dwellings associated with a user and/or to otherwise predicted user-specific dwelling preferences for a user, whether in addition to or instead of the illustrated types of techniques.

The illustrated embodiment of the routine 500 begins at block 505, where the routine obtains user data, dwelling data, and ADIP system data, such as for one or more users and for dwellings associated with the user(s). In block 510, the routine then determines or selects a particular user (e.g., selects a first user of some or all users), and retrieves user-specific dwelling data for multiple dwellings associated with that user. In block 515, the routine then determines whether there is visual data for two or more of the multiple dwellings to be analyzed, and if so continues to block 520 to determine one or more LLM prompts to cause one or more LLMs to generate information about shared attributes among the images and/or other visual data of the multiple dwellings (e.g., using one or more predefined prompts in the ADIP system data), supplies the visual data and each determined prompt to the one or more LLMs (e.g., consecutively if there are multiple prompts), and obtains determined shared attributes (if any) in the visual data for the dwellings from the one or more LLMs. After block 520, or if it is determined in block 515 not to analyze visual data, the routine in block 525 determines whether there is descriptive textual data for two or more of the multiple dwellings to be analyzed, and if so continues to block 530 to determine one or more LLM prompts to cause the one or more LLMs to generate information about shared attributes among the descriptive textual data for the multiple dwellings (e.g., using one or more predefined prompts in the ADIP system data), supplies the textual description data and each determined prompt to the one or more LLMs (e.g., consecutively if there are multiple prompts), and obtains determined shared attributes (if any) in the descriptive textual data for the dwellings from the one or more LLMs. After block 530, or if it is determined in block 525 not to analyze descriptive textual data, the routine in block 535 determines whether there is other descriptive data for two or more of the multiple dwellings of one or more other modalities to be analyzed (e.g., floor plans or other computer models, descriptive audio data, etc.), and if so continues to block 540 to determine one or more LLM prompts to cause the one or more LLMs to generate information about shared attributes among the other descriptive data for the multiple dwellings (e.g., using one or more predefined prompts in the ADIP system data), supplies the other descriptive data and each determined prompt to the one or more LLMs (e.g., consecutively if there are multiple prompts), and obtains determined shared attributes (if any) in the other descriptive data. After block 540, or if it is determined in block 535 not to analyze other dwelling-associated data, the routine in block 545 stores the shared dwelling attributes determined in blocks 520, 530 and 540, optionally are determining a priority or other ranking of the shared dwelling attributes for use as predicted user-specific dwelling preference data for the user. After block 545, the routine in block 555 determines if there are more users for which to analyze shared dwelling data attributes, and if so returns to block 510 to determine or select the next such user. Otherwise, the routine in block 590 optionally provides the determined shared dwelling attributes, and then returns in block 599, such as to return to the flow of FIG. 4 at block 425 if invoked from there.

Figure 6:
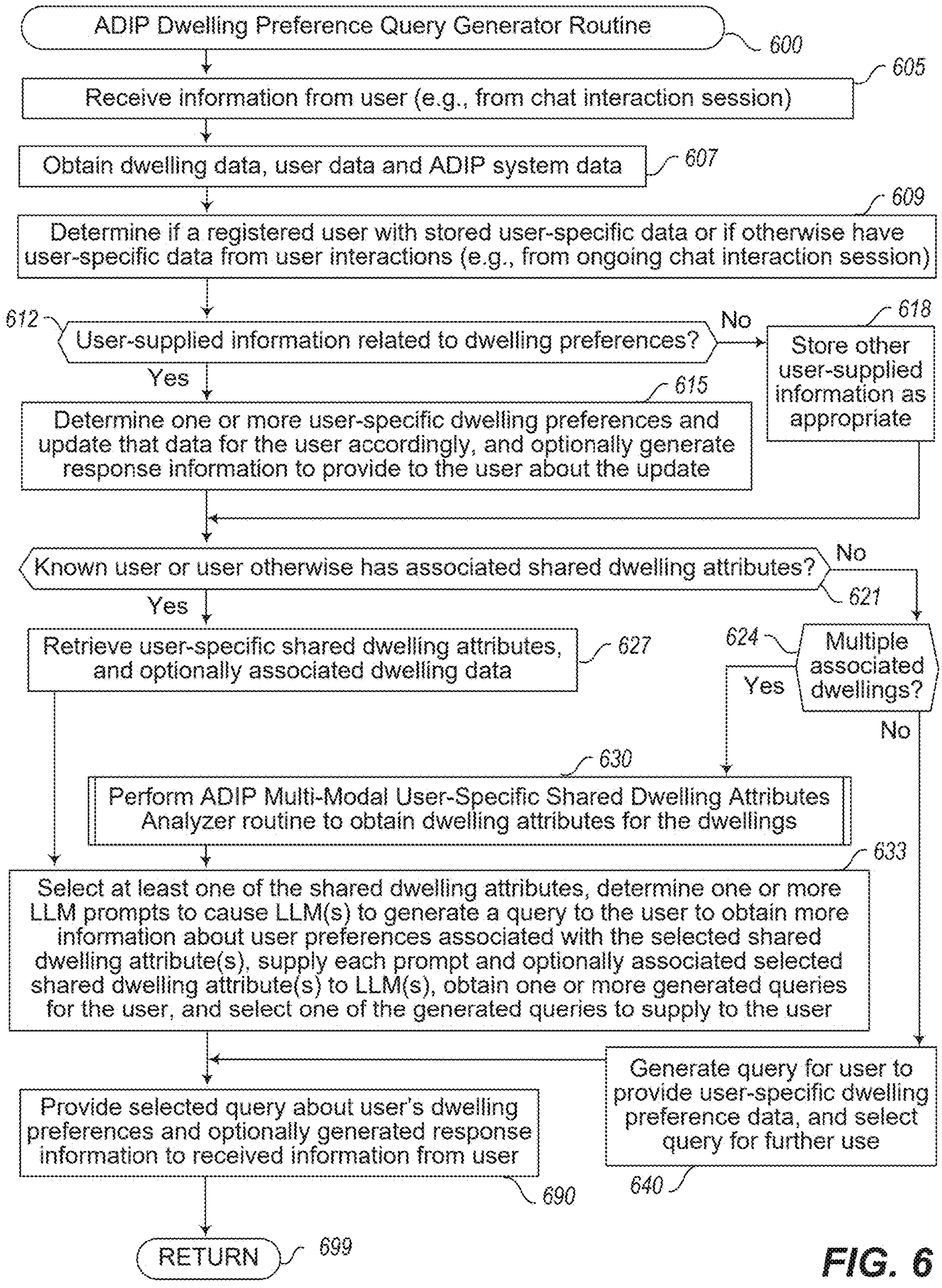
FIG. 6 illustrates a flow diagram of an example embodiment of an ADIP Dwelling Preference Query Generator component routine.

FIG. 6 is a flow diagram of an example embodiment of an ADIP Dwelling Preference Query Generator routine 600. The routine may be provided by, for example, execution of the ADIP Dwelling Preference Query Generator component 144 of FIGS. 1A-1D and/or a corresponding component (not shown) of the ADIP system 140 of FIG. 3 and/or with respect to corresponding functionality discussed with respect to FIGS. 2A-2E and elsewhere herein, such as to perform automated operations to provide a computer-implemented method to use one or more trained LLMs to generate a query for a user about user-specific dwelling preferences of the user and to optionally analyze and use user-supplied information (e.g., in response to a prior generated and supplied query). In addition, in at least some situations, the routine 600 may be performed based on execution of block 470 of FIG. 4, with resulting information provided and execution control returning to that location when the routine 600 ends—in other embodiments, the routine may be invoked in other manners. In this example, the routine 600 is performed using particular ways to generate a query for a user about user-specific dwelling preferences of the user and to analyze and use user-supplied information, but in other embodiments may use other techniques to use generate queries and/or analyze and use user-supplied response information, whether in addition to or instead of the illustrated types of techniques.

The illustrated embodiment of the routine 600 begins at block 605, where it receives information from a user (e.g., from a chat interaction session), and in block 607 obtains user data for the user, dwelling data for dwellings associated with the user, and ADIP system data. In block 609, the routine then determines if the user is a registered user that has stored user-specific data or if the routine otherwise has user-specific data for the user from previous user interactions (e.g., from an ongoing Interaction session). The routine then determines in block 612 whether the received information from the user includes user-supplied information related to dwelling preferences of the user, and if so in block 615 determines one or more user-specific dwelling preferences indicated by the user and updates corresponding information for the user accordingly, as well as to optionally generate a response to provide to the user in block 690 about the update being performed. Otherwise, the routine in block 618 stores other user-supplied information as appropriate, such as for a different type of preference of the user, about a group of multiple dwellings associated with the user (e.g., to update the group to remove or add one or more dwellings), etc., including to associate user-supplied information with a guest user who is not logged in for possible later use in an ongoing interaction session. After blocks 615 or 618, the routine determines in block 621 if the user has associated user-specific shared dwelling attributes, such as for a registered user for which such information was previously determined by the ADIP Multi-Modal User-Specific Dwelling Data Shared Attributes Analyzer routine-if so, the routine retrieves the user-specific shared dwelling attribute data and other user-specific dwelling preference data if available along with associated dwelling data in block 627, and, in block 633, then selects at least one of the shared dwelling attributes to use as a predicted user-specific dwelling preference (e.g., a shared dwelling attribute for which user-specific dwelling preference data is not already available, and optionally in a random manner or otherwise based on defined priority information from the ADIP system data or generated by the ADIP Multi-Modal User-Specific Dwelling Data Shared Attributes Analyzer routine), determines one or more LLM prompts to cause one or more LLMs to generate a query to the user to obtain more information from the user about user dwelling preferences associated with the selected one or more shared dwelling attributes, supplies each determined prompt and optionally associated selected shared dwelling attributes to the one or more LLMs (e.g., consecutively if multiple prompts), obtains one or more generated queries for the user from the LLMs, and selects one of the generated queries to supply to the user (e.g., in a random manner, based on defined priority information for an associated shared dwelling attribute, etc.). If it is determined in block 621 that the user does not have associated user-specific shared dwelling attributes, the routine instead determines in block 624 if there are multiple associated dwellings with the user (e.g., from prior interactions with the user during the interaction session), and if not in block 640 generates a query for the user to provide user-specific dwelling preference data (e.g., a predefined query from the ADIP system data 327) and selects the query for further use, and otherwise in block 630 performs the ADIP Multi-Modal User-Specific Dwelling Data Shared Attributes Analyzer routine to determine shared dwelling attributes in descriptive data for the multiple associated dwellings before further proceeding to block 633. After blocks 633 or 640, the resulting generated query about the user-specific dwelling preferences and optional response for the user is provided as output in block 690, and the routine then continues to block 699 and returns, such as to return to the flow of FIG. 4 at block 470 if invoked from there.

Figure 7:
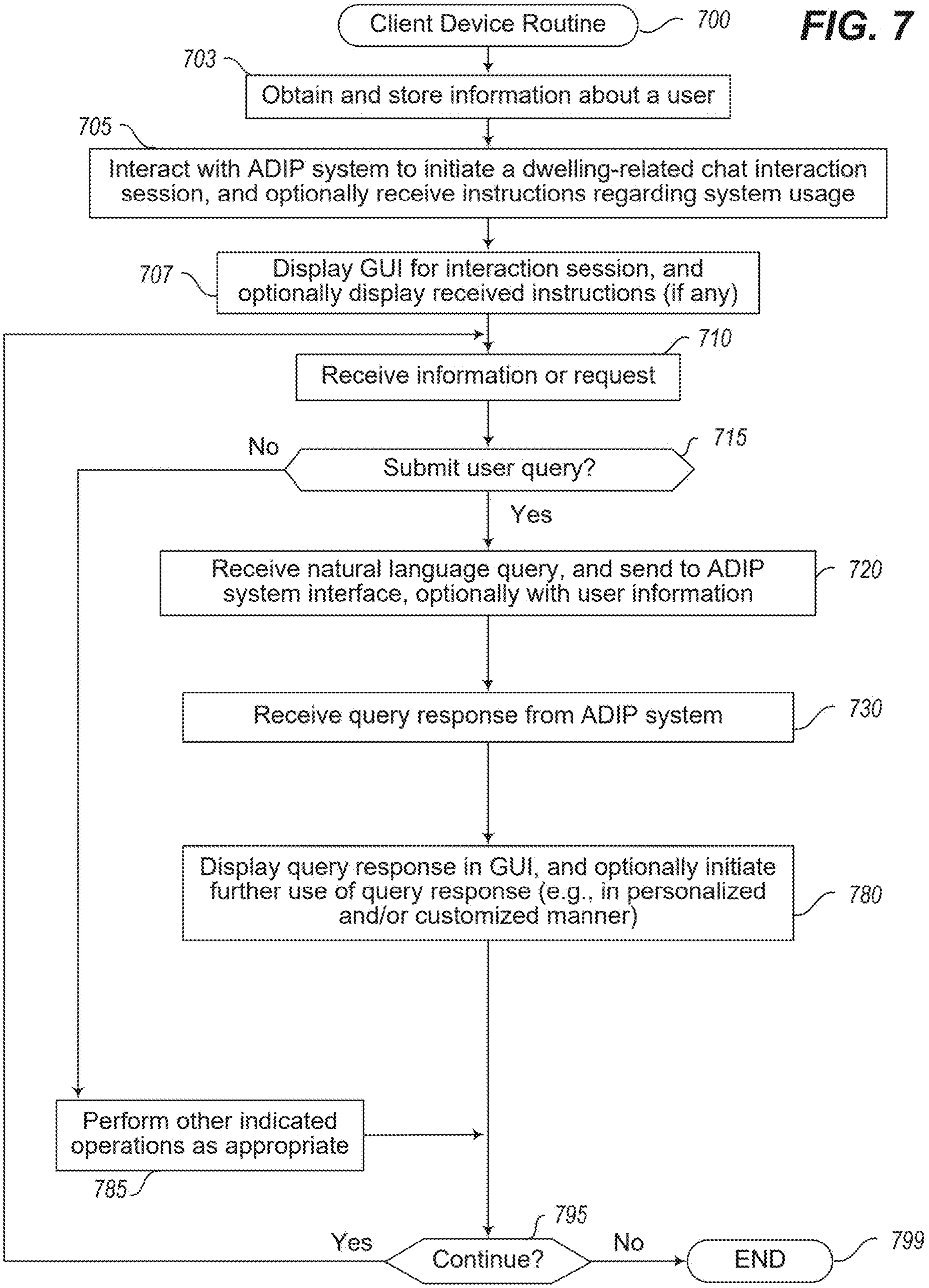
FIG. 7 illustrates a flow diagram of an example embodiment of a client device routine.

FIG. 7 is a flow diagram of an example embodiment of a client device routine 700. The routine may be provided by, for example, operations of a client computing device 360 of FIGS. 1A-1D and/or a client computing device 360 of FIG. 3 and/or with respect to corresponding functionality discussed with respect to FIGS. 2A-2E and elsewhere herein, such as to perform automated operations to provide a computer-implemented method to interact with users or other entities who submit queries (or other information) to the ADIP system, to receive responsive answers (or other information) from the ADIP system, and to optionally use the received information in one or more manners (e.g., to automatically initiate follow-up activities in accordance with a received responsive answer).

The illustrated embodiment of the routine 700 begins at block 703, where information is optionally obtained and stored about the user, such as for later use in personalizing or otherwise customizing further actions to that user. The routine then continues to block 705 to interact with the ADIP system to initiate an interaction session (e.g., in response to a corresponding instruction from the user), as well as to optionally receive a greeting and/or introductory instructions regarding using a GUI of the ADIP system. In block 707, the routine then displays a GUI for the interaction session, and optionally displays the received greeting and/or introductory instructions, if any. The routine then continues to perform blocks 710-780 as part of participating in the interaction session.

In particular, the routine continues to block 710 after block 707, where it waits until information or a request is received from the user. In block 715, the routine determines if the information or request received in block 710 is a search query to submit, such as in a natural language format (e.g., freeform text), and if not continues to block 785. Otherwise, the routine continues to block 720, where it sends the received query to the ADIP system interface, optionally along with additional information about the user from block 703, to obtain a corresponding responsive answer in block 730—in other embodiments, the routine may further modify the received user query to personalize and/or customize the information to be provided to the ADIP system (e.g., to add information specific to the user, such as location, demographic information, preference information, etc.). In block 780, the routine then displays the received query response in the GUI, and optionally initiates further use of the query response in one or more manners (e.g., in a manner that is personalized and/or customized for the user)—in some embodiments, the further initiated activities may include invoking of other functionality of the ADIP system, such as to initiate an inspection process for a selected dwelling indicated in dwelling information search results, to initiate a mortgage application process for a selected dwelling indicated in dwelling information search results, to initiate matching the user with a real estate professional as part of a housing search based on corresponding response information received from the ADIP system, etc.

In block 785, the routine instead performs one or more indicated operations as appropriate other than receiving and submitting a query, with non-exclusive examples including sending information to the ADIP system of other types, receiving and storing user data for later use in personalization and/or customization activities, receiving and responding to requests for information about previous user queries and/or corresponding responsive answers for a current user and/or client device, receiving and responding to indications of one or more housekeeping activities to perform, etc. After blocks 780 or 785, the routine continues to block 795 to determine whether to continue, such as until an explicit indication to terminate is received (or alternatively only if an explicit indication to continue is received). If it is determined to continue, the routine returns to block 710, and if not continues to block 799 and ends.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, synchronously or asynchronously, etc.) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the claims that are specified and the elements recited therein. In addition, while certain aspects of the invention may be presented at times in certain claim forms, the inventors contemplate the various aspects of the invention in any available claim form. For example, while only some aspects of the invention may be recited at a particular time as being embodied in a computer-readable medium, other aspects may likewise be so embodied.

What is claimed is:

1. A computer-implemented method comprising:

determining, by one or more computing devices, a group of multiple dwellings that are associated with a user based at least in part on previous interactions of the user with information about a plurality of dwellings available for acquisition, wherein the multiple dwellings are a subset of the plurality of dwellings;

obtaining, by the one or more computing devices, dwelling information about individual dwellings of the group of multiple dwellings, the dwelling information including a textual description and images for a corresponding dwelling in the group of multiple dwellings;

determining, by the one or more computing devices and using one or more trained first large language models (LLMs), shared dwelling attributes that are common to the group of multiple dwellings by inputting the dwelling information to the one or more trained first LLMs with one or more prompts and causing the one or more trained first LLMs to generate the shared dwelling attributes; and outputting, by the one or more computing devices, a chat interaction session via a graphical user interface (GUI), wherein outputting the chat interaction session includes:

generating, by the one or more computing devices and using one or more trained second LLMs, a first query indicating a predicted first preference of the user for a first shared dwelling attribute of the shared dwelling attributes and requesting confirmation from the user of the predicted first preference;

displaying the first query to the user in the GUI;

obtaining a first natural language response to the first query from the user via the GUI, and determining whether the user confirmed or denied the predicted first preference for the first shared dwelling attribute by parsing the first natural language response using the one or more second LLMs;

determining, by the one or more computing devices and based at least in part on the first natural language response, one or more additional dwellings of the plurality of dwellings that are distinct from the multiple dwellings; and displaying search results to the user in the GUI that includes information describing the one or more additional dwellings.

2. The computer-implemented method of claim 1 wherein the images for the corresponding dwelling in the group of multiple dwellings include panorama images and non-panorama perspective images, wherein the dwelling information further includes floor plans for the corresponding dwelling.

3. The computer-implemented method of claim 1 wherein the one or more trained first LLMs are different than the one or more trained second LLMs.

4. The computer-implemented method of claim 1, further comprising training the one or more trained first LLMs using real estate-specific training data that includes annotated data as input and corresponding expected output.

5. The computer-implemented method of claim 1, wherein determining the shared dwelling attributes includes:

supplying the images for the group of multiple dwellings with a first prompt to the one or more trained first LLMs to determine shared attributes in the images; and separately supplying the textual descriptions for the group of multiple dwellings with a second prompt to the one or more trained first LLMs to determine shared attributes in the textual descriptions.

6. The computer-implemented method of claim 1, wherein the first shared dwelling attribute is selected from the shared dwelling attributes based on the first shared dwelling attribute not having existing preference data for the user.

7. The computer-implemented method of claim 1, wherein generating the first query includes obtaining multiple candidate queries from the one or more trained second LLMs and selecting the first query from the multiple candidate queries.

8. The computer-implemented method of claim 1, wherein the first natural language response includes a denial of the predicted first preference and an alternative preference, and wherein the one or more additional dwellings are determined based at least in part on the alternative preference.

9. A computer-implemented method comprising:

obtaining, by one or more computing devices, dwelling information about a group of multiple dwellings that are associated with a user based on prior activities associated with the user, the group of multiple dwellings being a subset of a plurality of dwellings available for acquisition, and the dwelling information including textual description data and visual data for each of the multiple dwellings;

determining, by the one or more computing devices and using one or more trained first large language models (LLMs), one or more shared dwelling attributes that are common to the group of multiple dwellings by inputting the dwelling information to the one or more trained first LLMs with one or more prompts and causing the one or more trained first LLMs to generate the one or more shared dwelling attributes;

outputting, by the one or more computing devices, a chat interaction session, wherein outputting the chat interaction session includes:

displaying a query that includes:

a predicted preference for the user regarding a dwelling attribute of the one or more shared dwelling attributes, the predicted preference being generated by one or more trained second LLMs; and a prompt for the user to confirm or deny the predicted preference; and receiving feedback via input to the prompt confirming the predicted preference for the shared dwelling attribute; and presenting, by the one or more computing devices and based on the feedback, information describing one or more additional dwellings of the plurality of dwellings, the one or more additional dwellings being different than the multiple dwellings.

10. The computer-implemented method of claim 9, wherein the feedback comprises a natural language response to the query.

11. The computer-implemented method of claim 9, wherein the one or more trained second LLMs are part of the one or more trained first LLMs.

12. The computer-implemented method of claim 4, wherein the one or more shared dwelling attributes include at least one of an architectural style of an exterior of the multiple dwellings, a decoration style of an interior of the multiple dwellings, a geographical area in which the multiple dwellings are located, a point-of-interest instance or category proximate to each of the multiple dwellings, a structural feature of the multiple dwellings, or an attribute of properties on which the multiple dwellings are situated.

13. The computer-implemented method of claim 9, wherein the visual data of the dwelling information includes panorama images, non-panorama perspective images, and video frame images, wherein the dwelling information for the multiple dwellings further includes floor plans for the multiple dwellings and property records for the multiple dwellings.

14. The computer-implemented method of claim 9, wherein the visual data of the dwelling information includes:

images of exteriors of the multiple dwellings from at least one of a drone, an airplane, or a satellite; and ground-level images, wherein the textual description data includes property records for the multiple dwellings, narrative descriptions of the multiple dwellings, and keyword-value pairs for the multiple dwellings.

15. The computer-implemented method of claim 9, wherein outputting the chat interaction session further includes:

generating a second query requesting additional feedback from the user regarding an additional preference about an additional dwelling attribute of the multiple shared dwelling attributes, the additional preference being predicted by the one or more trained second LLMs; and receiving, in response to the second query, the additional feedback, the additional feedback including a denial of the additional preference, the method further comprising selecting, by the one or more computing devices, the one or more additional dwellings as excluding the additional second shared dwelling attribute.

16. The computer-implemented method of claim 9, further comprising determining a priority of the shared dwelling attributes for the user by analyzing the feedback, wherein the information about the one or more additional dwellings is ranked based on the priority of the shared dwelling attributes for the user.

17. The computer-implemented method of claim 9, wherein the prior activities by the user include at least one of viewing information about the multiple dwellings, saving the multiple dwellings for later use, performing in-person tours of the multiple dwellings, requesting additional information about the multiple dwellings, or reviewing of information about some of the plurality of dwellings separate from the multiple dwellings.

18. A system comprising:

one or more processors; and a computer-readable storage medium storing instructions that are executable by the one or more processors to perform operations comprising:

obtaining dwelling information about a group of multiple dwellings that are associated with a user based on prior activities associated with the user, the group of multiple dwellings being a subset of a plurality of dwellings available for acquisition, and the dwelling information including textual description data and visual data for each of the multiple dwellings;

determining, using one or more trained first large language models (LLMs), one or more shared dwelling attributes that are common to the group of multiple dwellings by inputting the dwelling information to the one or more trained first LLMs with one or more prompts and causing the one or more trained first LLMs to generate the one or more shared dwelling attributes;

outputting a chat interaction session, wherein outputting the chat interaction session includes:

displaying a query that includes:

a predicted preference for the user regarding a dwelling attribute of the one or more shared dwelling attributes, the predicted preference being generated by one or more trained second LLMs; and a prompt for the user to confirm or deny the predicted preference; and receiving feedback via input to the prompt confirming the predicted preference for the shared dwelling attribute; and presenting, based on the feedback, information describing one or more additional dwellings of the plurality of dwellings, the one or more additional dwellings being different than the multiple dwellings.

19. The system of claim 18, wherein the feedback comprises a natural language response to the query.

20. The system of claim 18, wherein the one or more trained second LLMs are part of the one or more trained first LLMs.

21. The system of claim 18, wherein the one or more shared dwelling attributes include at least one of an architectural style of an exterior of the multiple dwellings, a decoration style of an interior of the multiple dwellings, a geographical area in which the multiple dwellings are located, a point-of-interest instance or category proximate to each of the multiple dwellings, a structural feature of the multiple dwellings, or an attribute of properties on which the multiple dwellings are situated.

22. The system of claim 18, wherein the visual data of the dwelling information includes panorama images, non-panorama perspective images, and video frame images, wherein the dwelling information for the multiple dwellings further includes floor plans for the multiple dwellings and property records for the multiple dwellings.

23. The system of claim 18, wherein the visual data of the dwelling information includes:

images of exteriors of the multiple dwellings from at least one of a drone, an airplane, or a satellite; and ground-level images, wherein the textual description data includes property records for the multiple dwellings, narrative descriptions of the multiple dwellings, and keyword-value pairs for the multiple dwellings.

24. The system of claim 18, wherein outputting the chat interaction session further includes:

generating a second query requesting additional feedback from the user regarding an additional preference about an additional dwelling attribute of the multiple shared dwelling attributes, the additional preference being predicted by the one or more trained second LLMs; and receiving, in response to the second query, the additional feedback, the additional feedback including a denial of the additional preference, the operations further comprising selecting the one or more additional dwellings as excluding the additional second shared dwelling attribute.

25. The system of claim 18, the operations further comprising determining a priority of the shared dwelling attributes for the user by analyzing the feedback, wherein the information about the one or more additional dwellings is ranked based on the priority of the shared dwelling attributes for the user.

26. The system of claim 18, wherein the prior activities by the user include at least one of viewing information about the multiple dwellings, saving the multiple dwellings for later use, performing in-person tours of the multiple dwellings, requesting additional information about the multiple dwellings, or reviewing of information about some of the plurality of dwellings separate from the multiple dwellings.

* * * * *